United States Patent
Kim et al.

(10) Patent No.: US 10,477,296 B2
(45) Date of Patent: Nov. 12, 2019

(54) METHOD FOR CONTROLLING EARPIECE AND ELECTRONIC DEVICE FOR SUPPORTING THE SAME

(71) Applicant: Samsung Electronics Co., Ltd., Suwon-si, Gyeonggi-do (KR)

(72) Inventors: Eunhye Kim, Seoul (KR); Norio Okada, Yokohama (JP); Masato Suzuki, Kitaadachi-gun (JP); Jonghyuk Cho, Suwon-si (KR); Donghun Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/222,902

(22) Filed: Dec. 17, 2018

(65) Prior Publication Data

US 2019/0200113 A1    Jun. 27, 2019

(30) Foreign Application Priority Data

Dec. 27, 2017    (KR) .................. 10-2017-0180764

(51) Int. Cl.
*H04R 1/10*    (2006.01)
(52) U.S. Cl.
CPC ....... *H04R 1/1025* (2013.01); *H04R 2460/03* (2013.01)
(58) Field of Classification Search
CPC . H04R 1/1025; H04R 1/1033; H04R 2460/03
See application file for complete search history.

(56) References Cited

U.S. PATENT DOCUMENTS

| 2009/0180638 A1* | 7/2009 | Hsu ................. H04R 1/1025 381/74 |
| 2012/0087510 A1 | 4/2012 | Sampimon et al. |

(Continued)

FOREIGN PATENT DOCUMENTS

| CN | 204836508 U | 12/2015 |
| KR | 10-1686205 B1 | 12/2016 |

(Continued)

OTHER PUBLICATIONS

International Search Report dated Apr. 3, 2019 in connection with International Patent Application No. PCT/KR2018/015919, 3 pages.

(Continued)

*Primary Examiner* — Mark Fischer

(57) ABSTRACT

An electronic device according to various embodiments of the present disclosure may include a communication interface and a processor, wherein the processor may be configured to receive first battery level information of a first earpiece and second battery level information of a second earpiece, via the communication interface, to identify a charging method corresponding to the first battery level and the second battery level, among a plurality of charging methods for charging at least one of the first earpiece or the second earpiece, and to control to supply charging power to at least one of the first earpiece or the second earpiece, via a cable which connects the electronic device with at least one of the first earpiece or the second earpiece, using the charging method.

20 Claims, 27 Drawing Sheets

(56) References Cited

U.S. PATENT DOCUMENTS

2013/0244734 A1 9/2013 Latham et al.
2017/0164089 A1 6/2017 Lee et al.
2017/0295421 A1 10/2017 Hung

FOREIGN PATENT DOCUMENTS

KR 10-2017-0067050 A 6/2017
KR 10-1745898 B1 6/2017

OTHER PUBLICATIONS

Written Opinion of the International Searching Authority dated Apr. 3, 2019 in connection with International Patent Application No. PCT/KR2018/015919, 7 pages.

* cited by examiner

METHOD FOR CONTROLLING EARPIECE AND ELECTRONIC DEVICE FOR SUPPORTING THE SAME

CROSS-REFERENCE TO RELATED APPLICATION

This application is based on and claims priority under 35 U.S.C. § 119 to Korean Patent Application No. 10-2017-0180764, filed on Dec. 27, 2017, in the Korean Intellectual Property Office, the disclosure of which is incorporated by reference herein in its entirety.

BACKGROUND

1. Field

The present disclosure relates generally to a method for controlling an earpiece, and an electronic device for supporting the same.

2. Description of Related Art

In recent, with advances in digital technology, various electronic devices such as a mobile communication terminal, a smart phone, a tablet personal computer (PC), a personal digital assistant (PDA), an electronic organizer, a notebook, a wearable device, an Internet of things (IoT) device, or an audible device are widely used.

The electronic device may be connected to various audible devices (e.g., audio output devices such as wired headphones, wired earpieces, wireless headphones, or wireless earpieces). The electronic device may output audio data (e.g., a sound source) which is played, through the connected audible device, and a user may listen to the audio data of the electronic device through the audible device. The electronic device and the audible device may be connected through a wired interface (e.g., a connector connection) or a wireless interface (or a Bluetooth connection).

In recent, wireless earphones which operate in pair is developed as the audible device. Such wireless earphones may include a first earpiece and a second earpiece which are worn in respective ears of the user, and each earpiece may include a battery.

Battery voltages of the earpieces may vary according to how to use the wireless earphones and a surrounding environment. Hence, the earpiece of a lower voltage may be turned off (or discharged) first, and the user may not listen to music in stereo.

SUMMARY

To address the above-discussed deficiencies of the prior art, it is a primary aspect of the present disclosure to provide a method for controlling an earpiece by providing charging power and audio data to audible devices based on remaining battery amounts of the audible devices which operate in pair using wireless communication, and an electronic device for supporting the same.

According to various embodiments of the present disclosure, an electronic device may include a communication interface and a processor, wherein the processor may be configured to receive first battery level information of a first earpiece and second battery level information of a second earpiece, via the communication interface, to identify a charging method corresponding to the first battery level and the second battery level, among a plurality of charging methods for charging at least one of the first earpiece or the second earpiece, and to control to supply charging power to at least one of the first earpiece or the second earpiece, via a cable which connects the electronic device with at least one of the first earpiece or the second earpiece, using the charging method.

According to various embodiments of the present disclosure, a method for controlling an earpiece in an electronic device may include receiving first battery level information of a first earpiece and second battery level information of a second earpiece, via a communication interface, identifying a charging method corresponding to the first battery level and the second battery level, among a plurality of charging methods for charging at least one of the first earpiece or the second earpiece, and controlling to supply charging power to at least one of the first earpiece or the second earpiece, via a cable which connects the electronic device with at least one of the first earpiece or the second earpiece, using the charging method.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
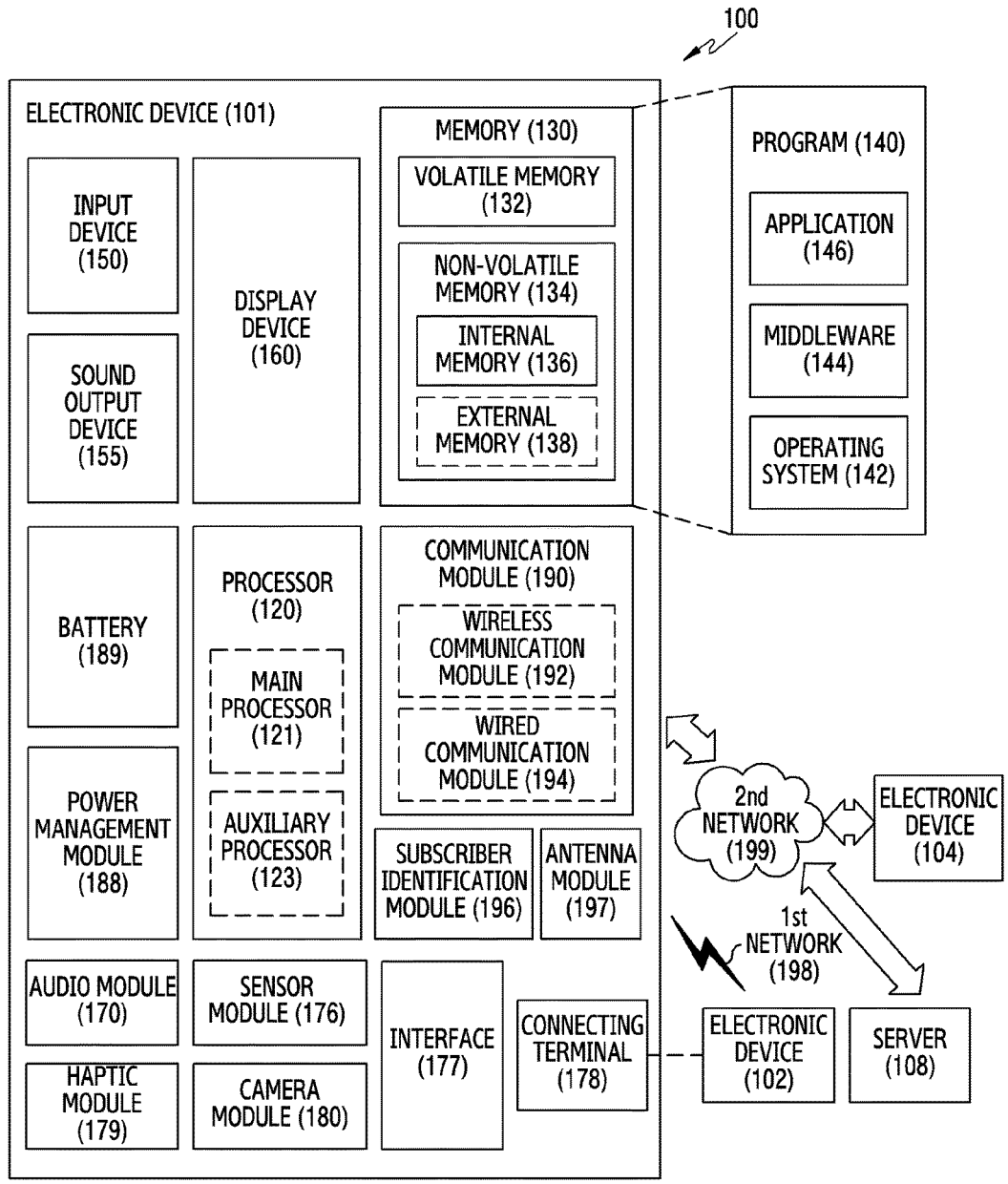
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In this embodiment, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
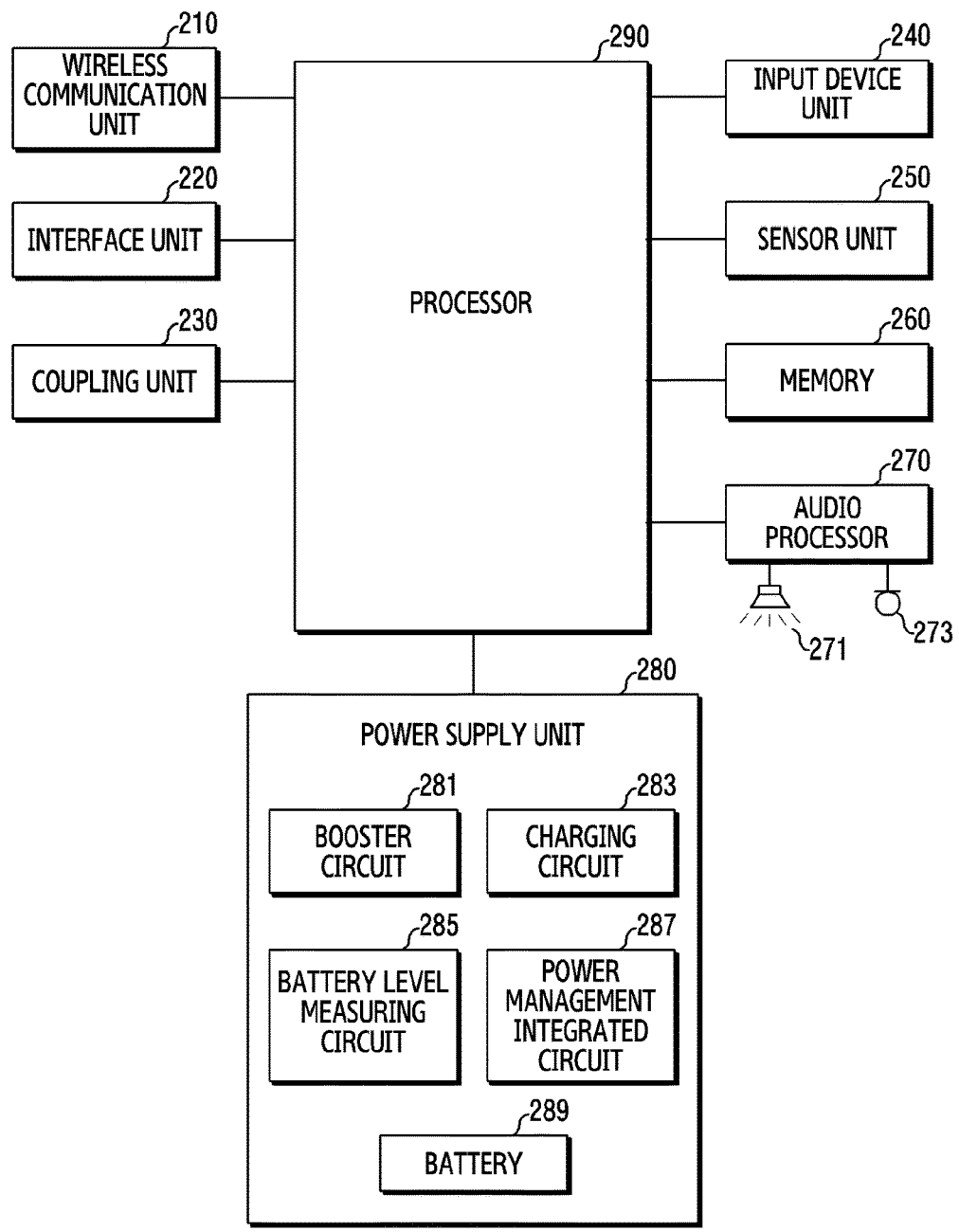
FIG. 2 is a block diagram illustrating an earpiece according to various embodiments of the present disclosure.

FIG. 2 is a block diagram illustrating an earpiece according to various embodiments of the present disclosure.

Referring to FIG. 2, an earpiece 200 of FIG. 2 may operate in pair and may correspond to an earpiece (hereafter, referred to as a first earpiece) for a user's left ear or an earpiece (hereafter, referred to as a second earpiece) for a user's right ear. In various embodiments, while the earpiece may indicate a device capable of receiving charging power or audio data from the electronic device 101 (or a charging device), the earpiece 200 may embrace any device, such as an ear bud, an earphone, or an audible device, which is worn in a user's ear to output audio data.

In an embodiment, the earpiece 200 (e.g., the first earpiece) may include a wireless communication unit 210, an interface unit 220, a coupling unit 230, an input device unit 240, a sensor unit 250, a memory 260, an audio processor 270, a power supply unit 280, and a processor 290.

In an embodiment, the wireless communication unit 210 may include at least one communication module for connecting communication with the electronic device 101 or the other earpiece (e.g., the second earpiece). In an embodiment, the wireless communication unit 210 may include, but not limited to, a Bluetooth module for performing Bluetooth communication with the electronic device 101. In an embodiment, the wireless communication unit 210 may include, but not limited to, a Bluetooth low energy (BLE) module for performing BLE communication with the other earpiece. The wireless communication unit 210 may include other short-range communication (e.g., wireless fidelity (WiFi), Zigbee, near field communication (NFC)) module for communicating with the electronic device 101 or the other earpiece. In an embodiment, the wireless communication unit 210 may include a communication module (e.g., a cellular communication module) for communicating with other external device than the electronic device 101 and the other earpiece.

In an embodiment, the interface unit 220 may perform wired communication with a cable which interconnects the earpiece 200 and the electronic device 101 by wire or a charging device which charges the earpiece 200 (or a battery 289 of the earpiece 200). In an embodiment, the wired communication may include at least one of universal serial bus (USB), high definition multimedia interface (HDMI), recommended standard (RS)-232, or plain old telephone service (POTS).

In an embodiment, the coupling unit 230 may couple (or combine, or contact) the earpiece 200 and the other earpiece. In an embodiment, the coupling unit 230 may include, but not limited to, a magnet of different magnet polarity from a magnet of the other earpiece. Besides the magnet, the coupling unit 230 may include any configuration for coupling the earpiece 200 and the other earpiece. In an embodiment, the coupling unit 230 may include a configuration for continuously (or fixedly) maintaining proximity (e.g., spaced within 1 cm) of the earpiece 200 and the other earpiece.

In an embodiment, the input device unit 240 may include, but not limited to, a touch pad or a hard key (or a button) for receiving an input from the user. The input device unit 240 may include a configuration for receiving various inputs from the user.

In an embodiment, the sensor unit 250 may include a sensor for detecting whether the earpiece 200 is worn (or not worn) in a user's body (e.g., ear). For example, the sensor unit 250 may include at least one of a heart rate monitoring (HRM) sensor, an electromyogram sensor, a temperature sensor, a proximity sensor, or a biometric sensor. Notably, the sensor for detecting whether the earpiece 200 is worn in the user's body is not limited those examples.

In an embodiment, the sensor unit 250 may include a sensor for detecting a movement and a location of the earpiece 200. For example, the sensor unit 250 may include at least one of an acceleration sensor, an angular velocity sensor, a global positioning system (GPS) sensor, or a rotation sensor.

In an embodiment, the sensor unit 250 may include a sensor for detecting whether the earpiece 200 is coupled with the other earpiece. For example, the sensor unit 250 may include a hall sensor for detecting the coupling (or the proximity) of the coupling unit 230 (e.g., the magnet) of the earpiece 200 and a coupling unit of the other earpiece (e.g., the second earpiece). The sensor for detecting the coupling of the coupling unit 230 of the earpiece 200 and the coupling unit of the other earpiece is not limited to the hall sensor.

In an embodiment, the memory 260 may include one or more programs executed by the processor 290. In an embodiment, the memory 260 may temporarily store data (e.g., audio data). In an embodiment, the memory 260 may include one or more application modules.

In an embodiment, the audio processor 270 may, under control of the processor 290, convert (e.g., decode) a digital audio signal corresponding to the audio data received from the electronic device 101 wirelessly or by wire, to an analog audio signal. The audio processor 270 may forward the converted analog audio signal to a speaker 271. In an embodiment, the audio processor 270 may convert an audio signal such as voice, which is received from a microphone 273, to a digital audio signal and provide the digital audio signal to the processor 290.

In an embodiment, the speaker 271 may output the audio data which is received from the wireless communication unit 210 or stored in the memory 260. In an embodiment, the speaker 271 may output audio data regarding various operations (or functions) executed at the earpiece 200.

In an embodiment, the microphone 273 may process an audio signal such as sound, obtained from outside, as electrical sound data. In an embodiment, the microphone 273 may cancel noise occurring in the audio signal, using various noise reduction algorithms.

In an embodiment, the power supply unit 280 may, under control of the processor 290, receive power from the battery 289 or an external device (e.g., a charging device) and provide required power supply (or power) to each component. In an embodiment, the power supply unit 280 may include a booster circuit 281, a charging circuit 283, a battery level measuring circuit 285, a power management integrated circuit 287, and a battery 289.

In an embodiment, the booster circuit 281 may be connected with the battery 289, to boost and forward a voltage of the battery 289 to the charging circuit 283.

In an embodiment, the charging circuit 283 may forward the voltage received from the booster circuit 281 to the power management integrated circuit 287, or forward a voltage received from the external device (e.g., the charging device) to at least one of the battery 289 or the power management integrated circuit 287.

In an embodiment, the battery level measuring circuit 285 (e.g., a fuel gauge) may measure information regarding the battery 289. In an embodiment, the information of the battery 289 may include a remaining amount, a voltage, a current, or a temperature of the battery 289. In an embodiment, the battery level measuring circuit 285 may measure the information of the battery 289 based on a signal received via an electrical path connected to the battery 289.

In an embodiment, the power management integrated circuit 287 (e.g., a PMIC) may manage the power of the earpiece 200. For example, the power management integrated circuit 287 may regulate the power transferred to each component of the earpiece 200.

In an embodiment, the battery 289 may be charged wirelessly or by wire under control of the power management integrated circuit 287. For example, the battery 289 may be charged by receiving the power from the electronic device 101 through a cable which may connect the earpiece 200 and the electronic device 101 by wire. For example, the battery 289 may be charged by receiving power from a charging device connected via the interface unit 220. In an embodiment, the battery 289 may include a variety of batteries such as a rechargeable battery or a solar cell.

In an embodiment, the processor 290 may control operations of the earpiece 200. In an embodiment, the processor 290 may have the same or similar configuration to the processor 120 of the electronic device 101 of FIG. 1. The operations of the processor 290 shall be elucidated by referring to FIG. 14, FIG. 15, and FIG. 16.

Although not depicted in FIG. 2, the earpiece 200 may further include a housing which surrounds at least part of the wireless communication unit 210, the interface unit 220, the coupling unit 230, the input device unit 240, the sensor unit 250, the memory 260, the audio processor 270, the power supply unit 280, and the processor 290, and a wearing unit for wearing the earpiece in the user's body.

In various embodiments, the earpiece 200 may include more configuration or less configuration than the configuration of FIG. 2.

An electronic device according to various embodiments of the present disclosure may include a communication interface and a processor, wherein the processor may be configured to receive first battery level information of a first earpiece and second battery level information of a second earpiece, via the communication interface, to identify a charging method corresponding to the first battery level and the second battery level, among a plurality of charging methods for charging at least one of the first earpiece or the second earpiece, and to control to supply charging power to at least one of the first earpiece or the second earpiece, via a cable which connects the electronic device with at least one of the first earpiece or the second earpiece, using the charging method.

In various embodiments, the processor may be configured to identify whether a difference between the first battery level and the second battery level exceeds a first threshold, and if the difference between the first battery level and the second battery level exceeds the first threshold, to supply the charging power to an earpiece of a low battery level among the first earpiece or the second earpiece.

In various embodiments, the processor may be configured to supply the charging power to the first earpiece and the second earpiece, if the difference between the first battery level and the second battery level falls below the first threshold.

In various embodiments, the processor may be configured to identify a battery level of the electronic device, if the battery level of the electronic device exceeds a second threshold, to control to supply the charging power to the first earpiece and the second earpiece via the cable, and if the battery level of the electronic device falls below second threshold, to control to stop the charging power supply to the first earpiece and the second earpiece via the cable.

In various embodiments, the processor may be configured to identify a battery level of the electronic device, if the battery level of the electronic device exceeds a third threshold, to control to supply the charging power to the first earpiece and the second earpiece via the cable, if the battery level of the electronic device falls below the third threshold and exceeds a fourth threshold, to control to supply the charging power to an earpiece of a low battery level among the first earpiece and the second earpiece via the cable, based on whether the difference between the first battery level and the second battery level exceeds the first threshold, and if the battery level of the electronic device falls below the fourth threshold, to control to stop the charging power supply to the first earpiece and the second earpiece via the cable.

In various embodiments, the processor may be configured to identify a battery level of the electronic device, if the battery level of the electronic device exceeds a third threshold, to control to supply the charging power to the first earpiece and the second earpiece via the cable, if the battery level of the electronic device falls below the third threshold and exceeds a fourth threshold, to control to supply the charging power to an earpiece which operates as a master among the first earpiece and the second earpiece via the cable, and if the battery level of the electronic device falls below the fourth threshold, to control to stop the charging power supply to the first earpiece and the second earpiece via the cable.

In various embodiments, the processor may be configured to identify an earpiece which operates as a master among the first earpiece and the second earpiece, and to control to supply the charging power first to the master earpiece over an earpiece which operates as a slave, via the cable.

In various embodiments, the processor may be configured to receive a user input which selects the first earpiece or the second earpiece, and to control to supply the charging power to the selected earpiece.

In various embodiments, the processor may be configured to, in response to receiving coupling information of the first earpiece and the second earpiece while transmitting audio data and supplying the charging power to the first earpiece and the second earpiece, stop audio data output of the first earpiece and the second earpiece and control the electronic device to output the audio data.

In various embodiments, the processor may be configured to identify that the first earpiece or the second earpiece is disconnected from the cable, and to control to supply the charging power to an earpiece which is still connected to the electronic device among the first earpiece and the second earpiece, via the cable.

Figure 3:
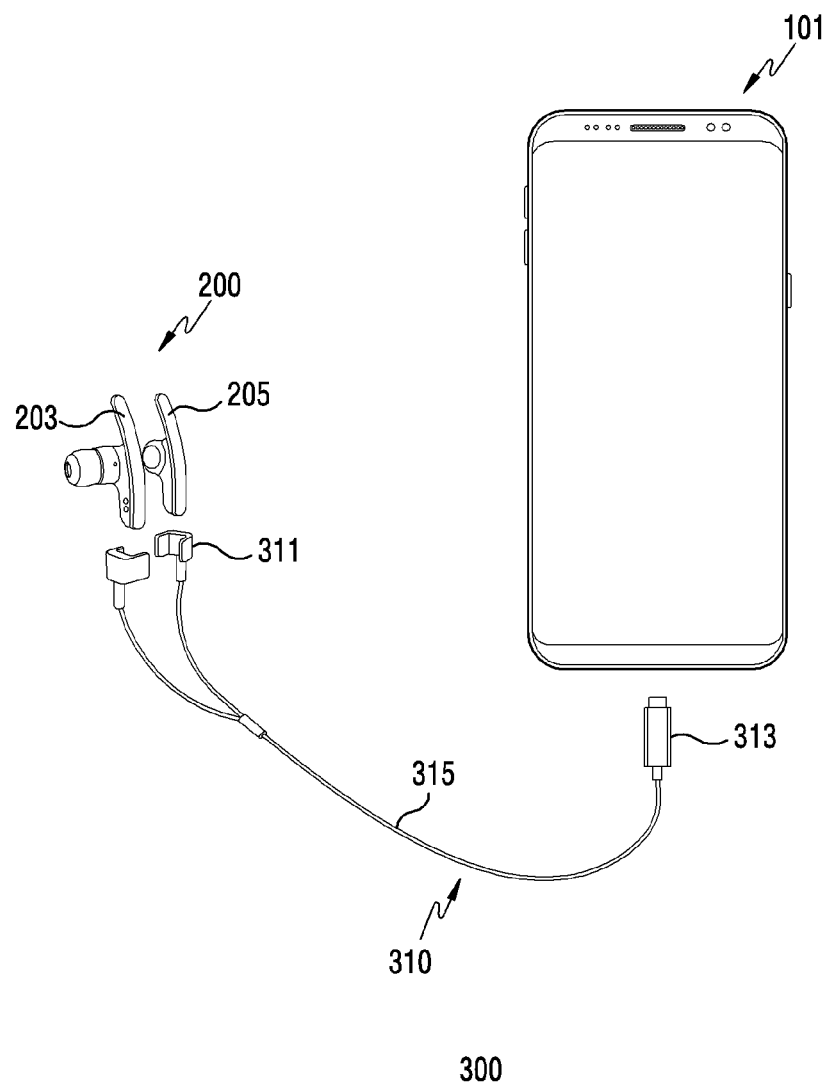
FIG. 3 is a system diagram for illustrating a method for controlling an earpiece according to various embodiments of the present disclosure.

FIG. 3 is a system diagram for illustrating a method for controlling an earpiece according to various embodiments of the present disclosure.

Referring to FIG. 3, a system 300 may include an electronic device 101, an earpiece 200, and a cable 310.

In an embodiment, based on at least part of battery level information (or remaining battery amount information) of a first earpiece 203 and battery level information of a second earpiece 205, the electronic device 101 may supply charging power to at least one of the first earpiece 203 or the second earpiece 205 via a cable 310.

In an embodiment, the electronic device 101 may receive the battery level information of the first earpiece 203 and the battery level information of the second earpiece 205, from the first earpiece 203 and the second earpiece 205 connected using a wireless communication scheme (e.g., Bluetooth).

In an embodiment, if the electronic device 101 is connected with the first earpiece 203 and the second earpiece 205 using the cable 310, the electronic device 101 may receive the battery level information of the first earpiece 203 and the battery level information of the second earpiece 205, from the first earpiece 203 and the second earpiece 205 via an interface connected with the cable 310.

In an embodiment, based on the battery level of the first earpiece 203 and the battery level of the second earpiece 205, the electronic device 101 may identify (or determine) a charging method for charging at least one of the first earpiece 203 or second earpiece 205 and charge at least one of the first earpiece 203 or the second earpiece 205 using the identified method.

In an embodiment, the electronic device 101 may identify whether a difference between the battery level of the first earpiece 203 and the battery level of the second earpiece 205 exceeds a designated threshold.

In an embodiment, if the difference between the battery level of the first earpiece 203 and the battery level of the second earpiece 205 exceeds the designated threshold, the electronic device 101 may supply the charging power to either the first earpiece 203 or the second earpiece 205, which has (or is identified with), but not limited to, a lower battery level, through the cable 310.

In an embodiment, the electronic device 101 may supply the charging power first to the earpiece of the low battery level through the cable 310 using a quick charging scheme (or a fast charging scheme). The quick charging scheme may supply the power fast by supplying a higher voltage or current than a normal charging scheme.

In an embodiment, if the difference between the battery level of the first earpiece 203 and the battery level of the second earpiece 205 is below the designated threshold, the electronic device 101 may supply the charging current to, but not limited to, the first earpiece 203 and the second earpiece 205 through the cable 310.

In an embodiment, based at least in part on the battery level information of the first earpiece 203, the battery level information of the second earpiece 205, and a battery level of the electronic device 101, the electronic device 101 may supply the charging current to at least one of the first earpiece 203 or the second earpiece 205 through the cable 310.

In an embodiment, the electronic device 101 may identify its battery level. If the battery level of the electronic device 101 exceeds a designated threshold, the electronic device 101 may supply the charging power to at least one of the first earpiece 203 or the second earpiece 205 through the cable 310, by considering the battery level information of the first earpiece 203 and the battery level information of the second earpiece 205. If the battery level of the electronic device 101 falls below the designated threshold, the electronic device 101 may not supply the charging current to the first earpiece 203 and the second earpiece 205. While the single designated threshold is compared with the battery level of the electronic device 101, the present disclosure is not limited to this example. For example, two or more designated thresholds may be compared with the battery level of the electronic device 101, to be explained.

In an embodiment, based at least in part on a designated priority, the electronic device 101 may identify a method for charging at least one of the first earpiece 203 or the second earpiece 205 and charge at least one of the first earpiece 203 or the second earpiece 205. In an embodiment, the processor 120 may identify the charging method which first charges an earpiece operating (or serving) as a master among the first earpiece 203 and the second earpiece 205. In an embodiment, even if the battery level of the first earpiece 203, which is the master, is higher than the battery level of the second earpiece 205, which is a slave, among the first earpiece 203 and the second earpiece 205, the processor 120 may identify a charging method which charges first the first earpiece 203 which is the master over the second earpiece 205 which is the slave. In an embodiment, the processor 120 may identify a charging method which first charges the earpiece of the lower battery level among the first earpiece 203 and the second earpiece 205. In an embodiment, based at least in part on a power consumption condition (or status) (or function execution) of at least one of the first earpiece 203 or the second earpiece 205, the processor 120 may identify a method for charging at least one of the first earpiece 203 or the second earpiece 205. For example, the processor 120 may identify that the first earpiece 203 performs a function (e.g., a voice call function, an audio data output function, etc.) and the second earpiece 205 is standing by (or sleeping). The processor 120 may identify a method for first charging the first earpiece 203 which performs the function over the second earpiece 205 which is standing by.

In an embodiment, the electronic device 101 may transmit audio data (or stereo audio data) to at least one of the first earpiece 203 or the second earpiece 205 using the wireless or wired communication scheme.

In an embodiment, the electronic device 101 may transmit audio data to the first earpiece 203 and the second earpiece 205 using Bluetooth. The wireless communication scheme for transmitting the audio data to the first earpiece 203 and the second earpiece 205 is not limited to Bluetooth.

If connecting with at least one of the first earpiece 203 or the second earpiece 205 through the cable 310, the electronic device 101 may transmit audio data to at least one of the first earpiece 203 or the second earpiece 205 connected using the cable 310.

In an embodiment, the cable 310 may include an interface 311 capable of connecting (or for connecting) the earpiece (e.g., the interface unit 220), an interface 313 capable of connecting the electronic device 101 (e.g., the connector of the electronic device 101), and a line (or wiring) 315.

In an embodiment, the cable 310 may transmit the charging power supplied from the electronic device 101 to the earpiece 200. In an embodiment, the cable 310 may transmit audio data from the electronic device 101 to the earpiece 200. In an embodiment, the cable 310 may transmit the battery level information of the earpiece 200 from the earpiece 200 to the electronic device 101.

In an embodiment, the cable 310 may include an audio processor (e.g., a digital analog converter (DAC)) for converting a digital audio signal to an analog audio signal.

In an embodiment, the cable 310 may connect or disconnect (or separate) the earpiece 200 or the electronic device 101. For example, the cable 310 may be connected to or disconnected from the earpiece 200 via the interface 311.

The cable 310 may be connected to or disconnected from the electronic device 101 via the interface 313.

In an embodiment, the earpiece 200 may receive the charging power from the electronic device 101. For example, the earpiece 200 may measure the battery level using the battery level measuring circuit 285. The earpiece 200 may transmit the measured battery level information to the electronic device 101. The earpiece 200 may receive the charging power from the electronic device 101 through the cable 310.

In an embodiment, the earpiece 200 may receive audio data from the electronic device 101. For example, the earpiece 200 may receive the audio data from the electronic device 101 through the cable 310 or the wireless communication unit 210. In an embodiment, the earpiece 200 may output the audio data received from the electronic device 101.

In an embodiment, the first earpiece 203 or the second earpiece 205 may be coupled. For example, the coupling unit (e.g., a magnet) of the first earpiece 203 and the coupling unit of the second earpiece 205 may be coupled. In an embodiment, the first earpiece 203 or the second earpiece 205 may detected its coupling using the sensor unit (e.g., a hall sensor). If detecting the coupling of the first earpiece 203 or the second earpiece 205, the first earpiece 203 or the second earpiece 205 may stop the audio data output and the electronic device 101 may output the audio data.

Now, a method of the electronic device 101 for controlling the earpiece 200 is now described in detail.

Figure 4:
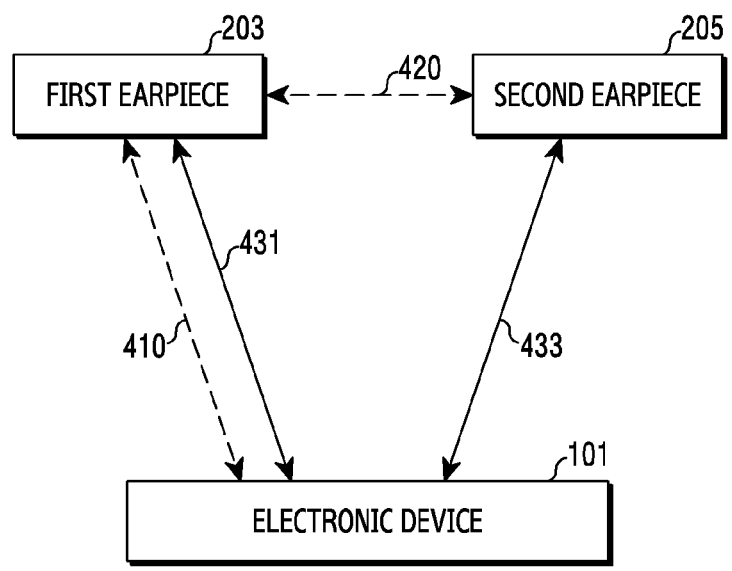
FIG. 4 is a diagram for illustrating a method of an electronic device for controlling an earpiece wirelessly or by wire according to various embodiments of the present disclosure.

FIG. 4 is a diagram for illustrating a method of an electronic device for controlling an earpiece wirelessly or by wire according to various embodiments of the present disclosure.

Referring to FIG. 4, the first earpiece 203 may establish a first wireless communication link 410 (or connect wireless communication) with the electronic device 101 (or an audio source device).

In an embodiment, the first earpiece 203 may operate as the master (or serve as the master) among the first earpiece 203 and the second earpiece 205. In an embodiment, if the first earpiece 203 operates as the master, the second earpiece 205 may operate as the slave. Hereinafter, it is assumed that the first earpiece 203 operates as the master and the second earpiece 205 operate as the slave to ease the understanding. Notably, the master and slave roles (or setting) of the first earpiece and the second earpiece 205 may be exchanged (or switched). For example, according to a user input for changing the master or the slave or an earpiece status (e.g., the battery level of the earpiece, etc.), the master and slave roles (or setting) of the first earpiece 203 and the second earpiece 205 may change, wherein, but not limited to, the first earpiece 203 operates as the slave and the second earpiece 205 operates as the master. The master role and the slave role of the first earpiece 203 and the second earpiece 205 may be fixed. For example, the master role and the slave role of the first earpiece 203 and the second earpiece 205 may be designated by a designer and may not be changed.

In an embodiment, if the first earpiece 203 operates as the master, the first earpiece 203 may establish the first wireless communication link 410 with the electronic device 101. In an embodiment, the first earpiece 203 may establish the first wireless communication link 410 with the electronic device 101, in response to a user input for outputting audio data played by the electronic device 101 through at least one of the first earpiece 203 or the second earpiece 205.

In an embodiment, the first wireless communication link 410 may be established according to, but not limited to, a Bluetooth protocol. The first wireless communication link 410 may be established according to a nonstandard Bluetooth protocol or a non-Bluetooth protocol.

In an embodiment, if the first earpiece 203 operates as the master and the second earpiece 205 operates as the slave, only the first earpiece 203 may perform a designated function. For example, if the electronic device 101 performs a voice call with an external device, the first earpiece 203 may output audio data (or voice data) received at the electronic device 101 from the external device. While the first earpiece 203 outputs the audio data, the second earpiece 205 may, but not limited to, stand by (or sleep) (or enter a standby state). For example, if the electronic device 101 receives a notification (e.g., an incoming message notification) from an external device, the first earpiece 203 may receive notification information from the electronic device 101 and output the notification. It is noted that operations (or functions) of the master are not limited to the above-stated examples.

In an embodiment, the first earpiece 203 may transmit or receive (or exchange) various information to or from the electronic device 101 via the first wireless communication link 410. For example, the first earpiece 203 may transmit the battery level information of the first earpiece 203 to the electronic device 101 via the first wireless communication link 410. For example, if receiving the battery level information of the second earpiece 205 from the second earpiece 205, the first earpiece 203 may transmit the received battery level information of the second earpiece 205 to the electronic device 101 via the first wireless communication link 410. For example, the first earpiece 203 may transmit to the electronic device 101 information indicating that the first earpiece 203 is worn in or detached from (or not worn in) the user's body. For example, the first earpiece 203 may transmit information indicating that the first earpiece 203 and the second earpiece 205 are coupled, to the electronic device 101 via the first wireless communication link 410. For example, if receiving audio data from the electronic device 101, the first earpiece 203 may transmit a response (e.g., acknowledge (ACK) or negative ACK (NACK)) indicating whether the first earpiece 203 successfully receives the audio data from the electronic device 101, to the electronic device 101 via the first wireless communication link 410. For example, the first earpiece 203 may receive from the second earpiece 205 information indicating whether the second earpiece 205 successfully receives audio data from the electronic device 101, and transmit a response (e.g., ACK or NACK) indicating whether the second earpiece 205 successfully receives the audio data from the electronic device 101, to the electronic device 101 via the first wireless communication link 410. The information transmitted or received by the first earpiece 203 and the electronic device 101 via the first wireless communication link 410 is not limited to those examples.

In an embodiment, the first earpiece 203 may receive audio data from the electronic device 101 via the first wireless communication link 410. For example, the first earpiece 203 may receive stereo data including left channel audio data and right channel audio data, from the electronic device 101 via the first wireless communication link 410. In an embodiment, if receiving left channel audio data and right channel audio data from the electronic device 101, the first earpiece 203 may decode the left channel audio data and output the decoded left channel audio data. In an embodiment, if receiving left channel audio data and right channel audio data from the electronic device 101, the first earpiece 203 may decode the left channel audio data and the right channel audio data and output the decoded left channel audio data and the decoded right channel audio data.

In an embodiment, the first earpiece 203 may establish a second wireless communication link 420 with the second earpiece 205.

In an embodiment, the second wireless communication link 420 may be established according to, but not limited to, the Bluetooth protocol. For example, the second wireless communication link 420 may be established according to, but not limited to, the BLE protocol. The second wireless communication link 420 may be established according to a nonstandard Bluetooth protocol or a non-Bluetooth protocol.

In an embodiment, the first earpiece 203 may transmit or receive various information via the second wireless communication link 420.

In an embodiment, the first earpiece 203 may receive the battery level information of the second earpiece 205, from the second earpiece 205 via the second wireless communication link 420. The first earpiece 203 may transmit the received battery level information of the second earpiece 205, to the electronic device 101 via the first wireless communication link 410.

In an embodiment, the first earpiece 203 may receive information of whether the second earpiece 205 successfully receives the audio data from the electronic device 101, from the second earpiece 205. The first earpiece 203 may transmit a response (e.g., ACK or NACK) indicating whether the second earpiece 205 successfully receives the audio data from the electronic device 101, to the electronic device 101 via the first wireless communication link 410.

In an embodiment, the first earpiece 203 may transmit communication parameter or mode parameter information to the second earpiece 205 via the second wireless communication link 420. In an embodiment, the communication parameter may be information for establishing the first wireless communication link 410. The communication parameter may be used for the second earpiece 205 to access (or observe) the first wireless communication link 410. The communication parameter may be used for the second earpiece 205 to obtain information transmitted and received via the first wireless communication link 410 by accessing the first wireless communication link 410. The communication parameter may be used for the second earpiece 205 to sniff (or snoop, or eavesdrop) the information (e.g., audio data) transmitted and received via the first wireless communication link 410. For example, if the first wireless communication link 410 is established based on the Bluetooth protocol, the communication parameter may include Bluetooth Device Address (BD_ADDR), logical transport address (LT_ADDR), native clock (CLKN) of a source (SRS) (e.g., the electronic device 101), clock offset between the SRC and a sink (SNK) (e.g., the first earpiece 203), and encryption parameter (e.g., key exchange) for a link between the SRC and the SNK.

In an embodiment, the mode parameter may include information regarding a sound effect or an audio filter applied to the output audio data. The mode parameter may include information (e.g., volume information, output loudness) of an output intensity or level applied to the output audio data. The mode parameter may include setting information of an application which is executed to play music at the electronic device 101. The mode parameter may include left channel information and right channel information of the audio data. The mode parameter may be used to output audio data applied with the same or similar effect (or processing) at the first earpiece 203 and the second earpiece 205.

In an embodiment, the first earpiece 203 and the second earpiece 205 may establish wired communication links 431 and 433 with the electronic device 101. For example, the first earpiece 203 and the second earpiece 205, which are connected to the electronic device 101 using the cable 310, may establish the wired communication links 431 and 433.

In an embodiment, the first earpiece 203 and the second earpiece 205 may transmit or receive various information via the wired communication links 431 and 433.

In an embodiment, the first earpiece 203 and the second earpiece 205 may transmit the battery level information of the first earpiece 203 and the battery level information of the second earpiece 205 to the electronic device 101 via the wired communication links 431 and 433.

In an embodiment, the first earpiece 203 and the second earpiece 205 may transmit information indicating that the first earpiece 203 and the second earpiece 205 are worn in or not worn in (or detached from) the user's body, to the electronic device 101 via the wired communication links 431 and 433.

In an embodiment, the first earpiece 203 and the second earpiece 205 may transmit information indicating that the first earpiece 203 and the second earpiece 205 are coupled, to the electronic device 101 via the wired communication links 431 and 433.

In an embodiment, the first earpiece 203 and the second earpiece 205 may receive audio data via the wired communication links 431 and 433. For example, the first earpiece 203 may receive, but not limited to, left channel audio data via the wired communication link 431, and the second earpiece 205 may receive, but not limited to, right channel audio data via the wired communication link 433.

In an embodiment, the first earpiece 203 and the second earpiece 205 may receive (be provided with) the charging power from the electronic device 101 via the wired communication links 431 and 433. The operations of the first earpiece 203 and the second earpiece 205 for receiving the charging power from the electronic device 101 via the wired communication links 431 and 433 are to be elucidated.

Figure 5:
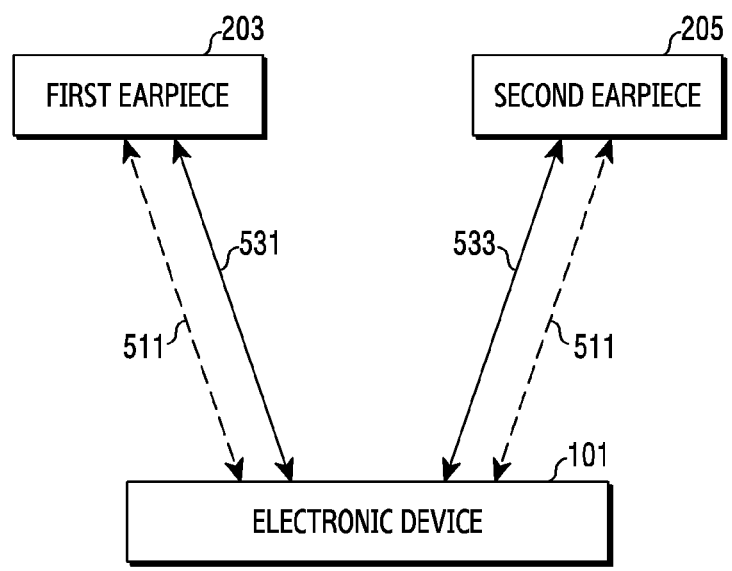
FIG. 5 is a diagram for illustrating a method of an electronic device for controlling an earpiece wirelessly or by wire according to various embodiments of the present disclosure.

FIG. 5 is a diagram for illustrating a method of an electronic device 101 for controlling an earpiece wirelessly or by wire according to various embodiments of the present disclosure.

Referring to FIG. 5, the first earpiece 203 may establish a third wireless communication link 511 with the electronic device 101, and the second earpiece 205 may establish a fourth wireless communication link 513 with the electronic device 101. For example, the electronic device 101 may multi-pair with the first earpiece 203 and the second earpiece 205.

In an embodiment, the first earpiece 203 and the second earpiece 205 may operate as slaves for the electronic device 101. The electronic device 101 may operate as a master for the first earpiece 203 and the second earpiece 205.

In an embodiment, the third wireless communication link 511 and the fourth wireless communication link 513 may be established according to, but not limited to, the Bluetooth protocol. The third wireless communication link 511 and the fourth wireless communication link 513 may be established according to a nonstandard Bluetooth protocol or a non-Bluetooth protocol.

In an embodiment, the first earpiece 203 and the second earpiece 205 may transmit or receive (or exchange) various information with the electronic device 101 via the third wireless communication link 511 and the fourth wireless communication link 513. For example, the first earpiece 203 may transmit its battery level information to the electronic device 101 via the third wireless communication link 511, and the second earpiece 205 may transmit its battery level information to the electronic device 101 via the fourth wireless communication link 513. For example, the first earpiece 203 and the second earpiece 205 may transmit information indicating that the first earpiece 203 and the second earpiece 205 are worn in or detached from the user's body, to the electronic device 101 via the third wireless communication link 511 and the fourth wireless communication link 513. For example, the first earpiece 203 and the second earpiece 205 may transmit information indicating that the first earpiece 203 and the second earpiece 205 are coupled, to the electronic device 101 via the third wireless communication link 511 and the fourth wireless communication link 513. Notably, the information transmitted or received by the first earpiece 203 and the second earpiece 205 to or from the electronic device 101 via the third wireless communication link 511 and the fourth wireless communication link 513 is not limited to those examples.

In an embodiment, the first earpiece 203 and the second earpiece 205 may receive audio data from the electronic device 101 via the third wireless communication link 511 and the fourth wireless communication link 513. For example, the first earpiece 203 may receive left channel audio data from the electronic device 101 via the third wireless communication link 511, and the second earpiece 205 may receive right channel audio data from the electronic device 101 via the fourth wireless communication link 513. In an embodiment, if receiving the left channel audio data and the right channel audio data from the electronic device 101, the first earpiece 203 may decode the left channel audio data and output the decoded left channel audio data.

In an embodiment, the first earpiece 203 and the second earpiece 205 may establish wired communication links 531 and 533 with the electronic device 101. For example, the first earpiece 203 and the second earpiece 205, which are connected to the electronic device 101 using the cable 310, may establish the wired communication links 531 and 533.

The operations of the first earpiece 203 and the second earpiece 205 for transmitting or receiving various information and receiving the charging power from the electronic device 101 via the wired communication links 531 and 533 in FIG. 5 are the same as or similar to at least in part the operations of the first earpiece 203 and the second earpiece 205 for transmitting or receiving various information and receiving the charging power from the electronic device 101 via the wired communication links 431 and 433 in FIG. 4, and thus their detailed explanations shall be omitted.

Figure 6:
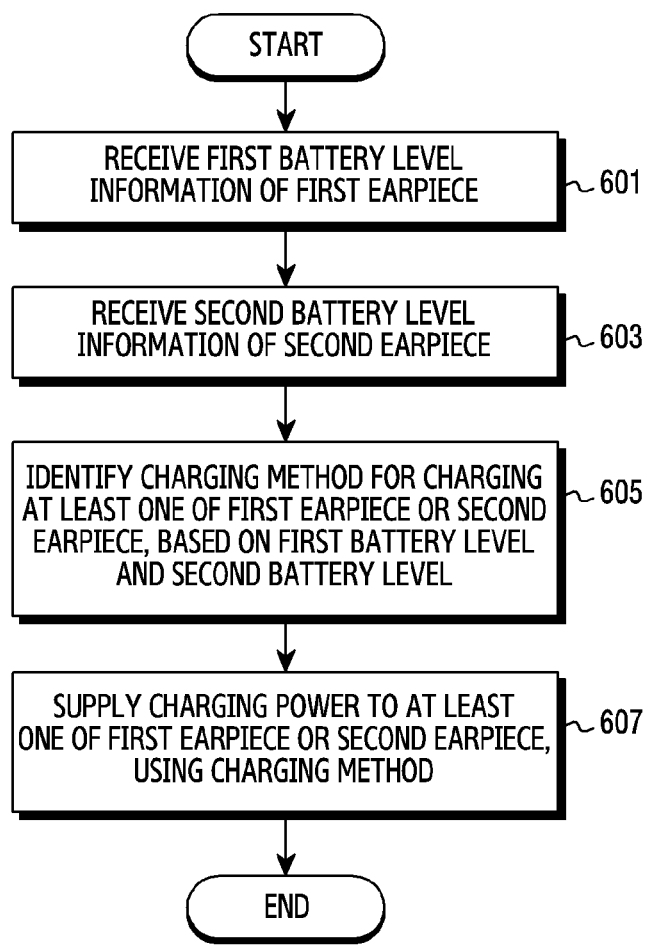
FIG. 6 is a flowchart for illustrating a method for controlling an earpiece according to various embodiments of the present disclosure.

FIG. 6 is a flowchart for illustrating a method for controlling an earpiece according to various embodiments of the present disclosure.

Referring to FIG. 6, in operation 601, the processor 120 may receive first battery level information (or remaining battery amount information) of the first earpiece 203.

In an embodiment, the processor 120 may receive the first battery level information of the first earpiece 203 via the first wireless communication link 410 or the third wireless communication link 511. In an embodiment, if the electronic device 101 and the first earpiece 203 are connected through the cable 310, the electronic device 101 may receive the first battery level information of the first earpiece 203 via the wired communication link 431 and 531.

Although not depicted in FIG. 6, before receiving the first battery level information of the first earpiece 203 via the first wireless communication link 410 or the third wireless communication link 511, the processor 120 may control the communication module 190 to establish the first wireless communication link 410 or the third wireless communication link 511 between the electronic device 101 and the first earpiece 203.

In operation 603, the processor 120 may receive second battery level information of the second earpiece 205.

In an embodiment, the processor 120 may receive the second battery level information of the second earpiece 205 from the first earpiece 203 via the first wireless communication link 410. In an embodiment, if receiving the second battery level information of the second earpiece 205 from the second earpiece 205 via the second wireless communication link 420, the processor 120 may receive the second battery level information of the second earpiece 205 from the first earpiece 203 via the first wireless communication link 410.

In an embodiment, the processor 120 may receive the second battery level information of the second earpiece 205 directly from the second earpiece 205 via the fourth wireless communication link 513.

In an embodiment, if the electronic device 101 and the second earpiece 205 are connected through the cable 310, the electronic device 101 may receive the second battery level information of the second earpiece 205 via the wired communication link 433 and 533.

Although not depicted in FIG. 6, before receiving the second battery level information of the second earpiece 205 via the first wireless communication link 410 or the fourth wireless communication link 513, the processor 120 may control the communication module 190 to establish the first wireless communication link 410 between the electronic device 101 and the first earpiece 203 or to establish the fourth wireless communication link 513 between the electronic device 101 and the second earpiece 205.

In operation 605, based on the first battery level and the second battery level, the processor 120 may identify (or determine) a charging method for charging at least one of the first earpiece 203 or the second earpiece 205.

In an embodiment, the processor 120 may identify the method for charging at least one of the first earpiece 203 or the second earpiece 205, based at least in part on whether a difference between the first battery level and the second battery level exceeds a designated value. For example, the processor 120 may identify the method for first charging either the first earpiece 203 or the second earpiece 205 if the difference between the first battery level and the second battery level exceeds a first threshold, and charging both of the first earpiece 203 and the second earpiece 205 if the difference between the first battery level and the second battery level falls below the first threshold.

In an embodiment, the processor 120 may identify a method for charging at least one of the first earpiece 203 or the second earpiece 205, based at least in part on a user input which selects an earpiece to charge. For example, the processor 120 may receive from the user, an input which selects a user's intended earpiece to charge among the first earpiece 203 and the second earpiece 205. The processor 120 may identify that the selected earpiece of the first earpiece 203 and the second earpiece 205 is charged first.

In an embodiment, the processor 120 may identify a method for charging at least one of the first earpiece 203 or the second earpiece 205, based at least in part on the first battery level, the second battery level, and the battery level of the electronic device 101.

In an embodiment, the processor 120 may identify a method for charging at least one of the first earpiece 203 or the second earpiece 205, based at least in part on a designated priority. In an embodiment, the processor 120 may identify a charging method for first charging a master earpiece (or the earpiece serving as the master) among the first earpiece 203 and the second earpiece 205. In an embodiment, even if the battery level of the first earpiece 203 which is the master is higher than the battery level of the second earpiece 205 which is the slave, the processor 120 may identify a charging method for first charging the first earpiece 203 which is the master over the second earpiece 205 which is the slave. In an embodiment, the processor 120 may identify a charging method for first charging the earpiece of the low battery level among the first earpiece 203 and the second earpiece 205. In an embodiment, the processor 120 may identify a charging method for first charging at least one of the first earpiece 203 or the second earpiece 205, based at least in part on a power consumption condition (or status) (or function execution) of at least one of the first earpiece 203 or the second earpiece 205. For example, the processor 120 may identify that the first earpiece 203 performs a function (e.g., a voice call function, an audio data output function, etc.) and the second earpiece 205 is standing by (or sleeping). The processor 120 may identify a method for first charging the first earpiece 203 which performs the function over the second earpiece 205 which is standing by.

In operation 607, using the charging method identified in operation 605, the processor 120 may control the power management module 188 to supply the charging power to at least on e of the first earpiece 203 or the second earpiece 205.

In an embodiment, if the difference between the first battery level and the second battery level exceeds a designated threshold using a quick charging scheme (or a normal charging scheme), the processor 120 may control the power management module 188 to supply the charging power first to the earpiece of the low battery level through the cable 310. In an embodiment, the processor 120 may control the power management module 188 to supply the charging power first to the earpiece of a high priority through the cable 310, according to a designated priority using the quick charging scheme (or the normal charging scheme).

In an embodiment, the processor 120 may output a notification regarding the earpiece information to charge first, among the first earpiece 203 and the second earpiece 205. For example, the processor 120 may output an indication or a sound indicating the earpiece to charge first, among the first earpiece 203 and the second earpiece 205.

In an embodiment, if the electronic device 101 is connected with the earpiece to charge first, among the first earpiece 203 and the second earpiece 205, through the cable 310, the processor 120 may output information indicating (or guiding) to connect the cable 310 to the electronic device 101 and the earpiece to charge first.

In an embodiment, the processor 120 may control the power management module 188 to fully charge the earpiece of the low battery level by supplying the charging power first to the earpiece of the low battery level and then to supply the charging power to the earpiece of the high battery level.

In an embodiment, the processor 120 may control the power management module 188 to fully charge the earpiece of the high priority by supplying the charging power first to the earpiece of the high priority and then to supply the charging power to the earpiece of the low priority.

In an embodiment, the processor 120 may control the power management module 188 to supply the charging power first to the earpiece of the high priority, and after the battery level of the earpiece of the high priority reaches a designated battery level, to supply the charging power to the earpiece of the low priority.

In an embodiment, if the charging power is supplied first to the first earpiece 203 and then the battery level of the first earpiece 203 reaches the battery level of the second earpiece 205 (or reaches the same battery level as the second earpiece 205), the processor 120 may control the power management module 188 to supply the charging power to the first earpiece 203 and the second earpiece 205 so as to charge the first earpiece 203 and the second earpiece 205 at the same time.

In an embodiment, if the difference between the first battery level and the second battery level falls below the designated threshold, the processor 120 may control the power management module 188 to supply the charging power to both of the first earpiece 203 and the second earpiece 205 through the cable 310.

In an embodiment, if the same priority (e.g., if the first earpiece 203 and the second earpiece 205 do not execute functions) or no priority is assigned to the first earpiece 203 and the second earpiece 205, the processor 120 may control the power management module 188 to supply the charging power to the first earpiece 203 and the second earpiece 205 through the cable 310.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the normal charging scheme.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the quick charging scheme.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the quick charging scheme until the battery level of at least one of the first earpiece 203 or the second earpiece 205 reaches the designated battery level, and to supply the charging power using the normal charging scheme if the battery level reaches the designated battery level.

Now, the method for controlling the earpiece is elucidated by referring to the drawings.

Figure 7:
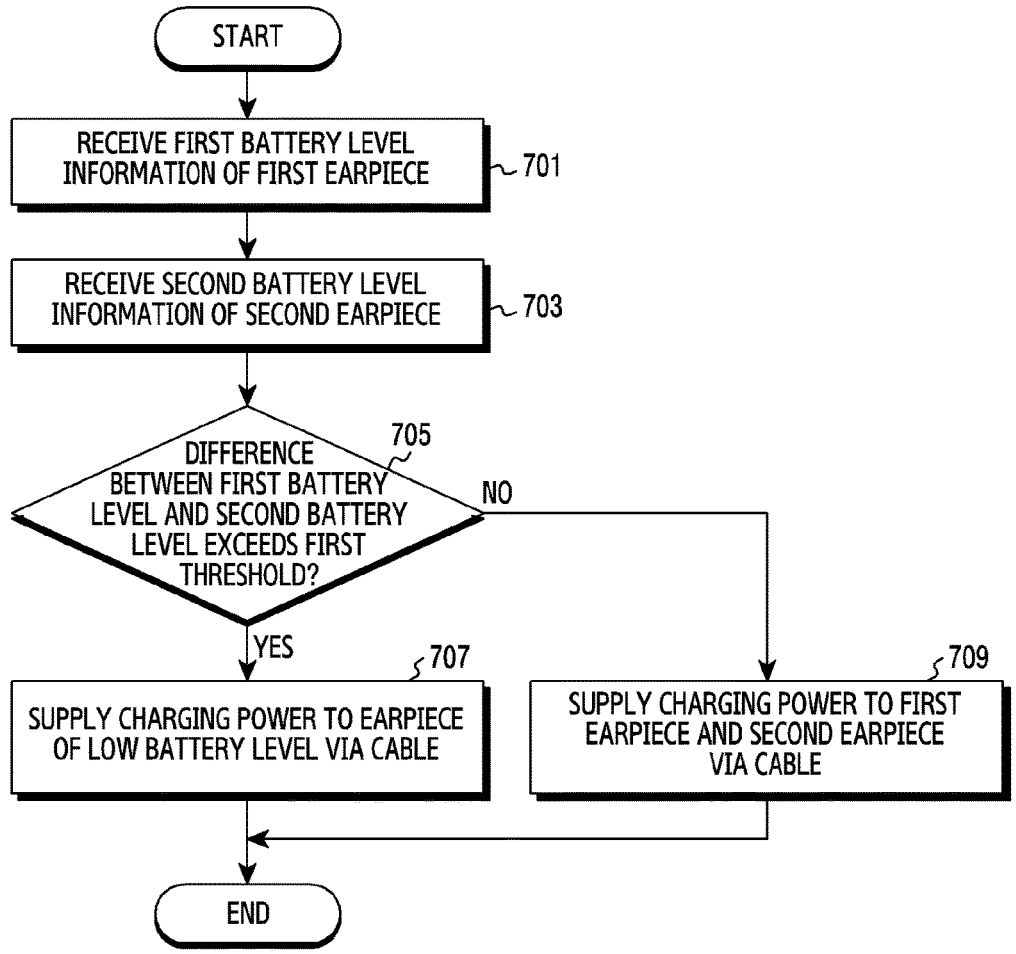
FIG. 7 is a flowchart for illustrating a method for controlling an earpiece according to various embodiments of the present disclosure.

FIG. 7 is a flowchart for illustrating a method for controlling an earpiece according to various embodiments of the present disclosure.

Referring to FIG. 7, in operation 701, the processor 120 may receive first battery level information (or remaining battery amount information) of the first earpiece 203.

In an embodiment, the processor 120 may receive the first battery level information of the first earpiece 203 via the first wireless communication link 410 or the third wireless communication link 511. In an embodiment, if the electronic device 101 and the first earpiece 203 are connected through the cable 310, the electronic device 101 may receive the first battery level information of the first earpiece 203 via the wired communication link 431 and 531.

Although not depicted in FIG. 7, before receiving the first battery level information of the first earpiece 203 via the first wireless communication link 410 or the third wireless communication link 511, the processor 120 may control the communication module 190 to establish the first wireless communication link 410 or the third wireless communication link 511 between the electronic device 101 and the first earpiece 203.

In operation 703, the processor 120 may receive the second battery level information of the second earpiece 205.

In an embodiment, the processor 120 may receive the second battery level information of the second earpiece 205 from the first earpiece 203 via the first wireless communication link 410. For example, if the first earpiece 203 receives the second battery level information of the second earpiece 205 from the second earpiece 205 via the second wireless communication link 420, the processor 120 may receive the second battery level information of the second earpiece 205 from the first earpiece 203 via the first wireless communication link 410.

In an embodiment, the processor 120 may receive the second battery level information of the second earpiece 205 directly from the second earpiece 205 via the fourth wireless communication link 513.

In an embodiment, if the electronic device 101 and the second earpiece 205 are connected through the cable 310, the electronic device 101 may receive the second battery level information of the second earpiece 205 via the wired communication link 433 and 533.

Although not depicted in FIG. 7, before receiving the second battery level information of the second earpiece 205 via the first wireless communication link 410 or the fourth wireless communication link 513, the processor 120 may control the communication module to establish the first wireless communication link 410 between the electronic device 101 and the first earpiece 203 or to establish the fourth wireless communication link 513 between the electronic device 101 and the second earpiece 205.

In operation 705, the processor 120 may identify whether a difference between the first battery level and the second battery level exceeds a first threshold.

In an embodiment, the processor 120 may differently set (or adjust) the first threshold, according to whether the first battery level of the first earpiece 203 which is a master exceeds the second battery level of the second earpiece 205 which is a slave. For example, the processor 120 may make the first threshold which is set if the first battery level exceeds the second battery level, greater than the first threshold which is set if the first battery level falls below the second battery level. In an embodiment, the first earpiece 203 which is the master may consume the power faster than the second earpiece 205 which is the slave.

In an embodiment, the processor 120 may vary the first threshold according to whether the electronic device 101 transmits audio data to at least one of the first earpiece 203 or the second earpiece 205 via the wireless communication link or via the wired communication link. For example, if transmitting the audio data to at least one of the first earpiece 203 or the second earpiece 205 via the wireless communication link, the processor 120 may set the first threshold to be greater than the audio data transmission via the wired communication link. In an embodiment, more power may be consumed than the audio data transmission from the electronic device 101 to the earpiece via the wireless communication link.

In an embodiment, the processor 120 may vary the first threshold according to a power consumption condition (or status) of at least one of the first earpiece 203 or the second earpiece 205. For example, if the first earpiece 203 which operates as the master performs a voice call function, the second earpiece 205 which operates as the slave is standing by (or sleeping), and the first battery level is lower than the second battery level, the first threshold may be set to be smaller than not functioning of the first earpiece 203 and the second earpiece 205. For example, if at least one of the first earpiece 203 or the second earpiece 205 performs a function (e.g., if the first earpiece 203 and the second earpiece 205 output stereo audio data), the first threshold may be set to be smaller than not functioning of the first earpiece 203 and the second earpiece 205.

In an embodiment, the processor 120 may set the first threshold, by combining whether the first battery level of the first earpiece 203 which operates as the master is greater than the second battery level of the second earpiece 205 which operates as the slave, whether the electronic device 101 transmits the audio data to at least one of the first earpiece 203 or the second earpiece 205 via the wireless communication link or via the wired communication link, and the power consumption condition (or status) of at least one of the first earpiece 203 or the second earpiece 205.

In an embodiment, the processor 120 may set (or change) the first threshold according to a user input. For example, the processor 120 may receive a user input for setting the first threshold. The processor 120 may set the first threshold based at least in part on the user input.

If the difference between the first battery level and the second battery level exceeds the first threshold in operation 705, the processor 120 may control the power management module 188 to supply the charging power to the earpiece of the low battery level among the first earpiece 203 and the second earpiece 205 through the cable 310 in operation 707.

In an embodiment, the processor 120 may control the power management module 188 to, but not limited to, supply the charging power first to the earpiece of the low battery level through the cable 310 using the quick charging scheme. The processor 120 may control the power management module 188 to, but not limited to, supply the charging power first to the earpiece of the low battery level through the cable 310 using the normal charging scheme.

In an embodiment, the processor 120 may output a notification regarding the earpiece of the low battery level among the first earpiece 203 and the second earpiece 205. For example, if the first earpiece 203 has the lower battery level than the second earpiece 205, the processor 120 may output indication, vibration, light, or sound indicative of the low battery level of the first earpiece 203.

In an embodiment, if the electronic device 101 is not connected with the earpiece of the low battery level among the first earpiece 203 and the second earpiece 205 via the cable 310, the processor 120 may output information indicating (or guiding) to connect the cable 310 to the electronic device 101 and the earpiece of the low battery level.

In an embodiment, the processor 120 may control the power management module 188 to fully charge the earpiece of the low battery level by supplying the charging power first to the earpiece of the low battery level and then to supply the charging power to the first earpiece 203 and the second earpiece 205 so as to supply the charging power to the earpiece of the high battery level.

In an embodiment, the processor 120 may control the power management module 188 to supply the charging power first to the earpiece of the low battery level and then, if the earpiece of the low battery level reaches a designated battery level, to supply the charging power to the first earpiece 203 and the second earpiece 205 so as to charge the earpiece (e.g., the first earpiece 203) of the low battery level and the earpiece (e.g., the second earpiece 205) of the high battery level at the same time.

For example, if the charging power is supplied first to the first earpiece 203 and then the battery level of the first earpiece 203 reaches the battery level of the second earpiece 205 (or equals the battery level of the second earpiece 205), the processor 120 may control the power management module 188 to supply the charging power to the first earpiece 203 and the second earpiece 205 in order to charge both of the first earpiece 203 and the second earpiece 205.

For example, if the charging power is supplied first to the first earpiece 203 which operates as the master and then the battery level of the first earpiece 203 is higher than the battery level of the second earpiece 205 which operates as the slave, by a designated battery level, the processor 120 may control the power management module 188 to supply the charging power to the first earpiece 203 and the second earpiece 205 in order to charge both of the first earpiece 203 and the second earpiece 205.

If the difference between the first battery level and the second battery level falls below the first threshold in operation 705, the processor 120 may control the power management module 188 to supply the charging power to the first earpiece 203 and the second earpiece 205 through the cable 310 in operation 709.

In an embodiment, the processor 120 may control the power management module 188 to supply the charging power to the first earpiece 203 and the second earpiece 205 via the cable 310 using the normal charging scheme.

In an embodiment, the processor 120 may control the power management module 188 to supply the charging power to the first earpiece 203 and the second earpiece 205 via the cable 310 using the quick charging scheme.

In an embodiment, the processor 120 may control the power management module 188 to supply the charging power to the first earpiece 203 and the second earpiece 205 via the cable 310 using the quick charging scheme until the battery levels of the first earpiece 203 and the second earpiece 205 reach a designated battery level, and to supply the charging power using the normal charging scheme if the battery levels reach the designated battery level.

Figure 8:
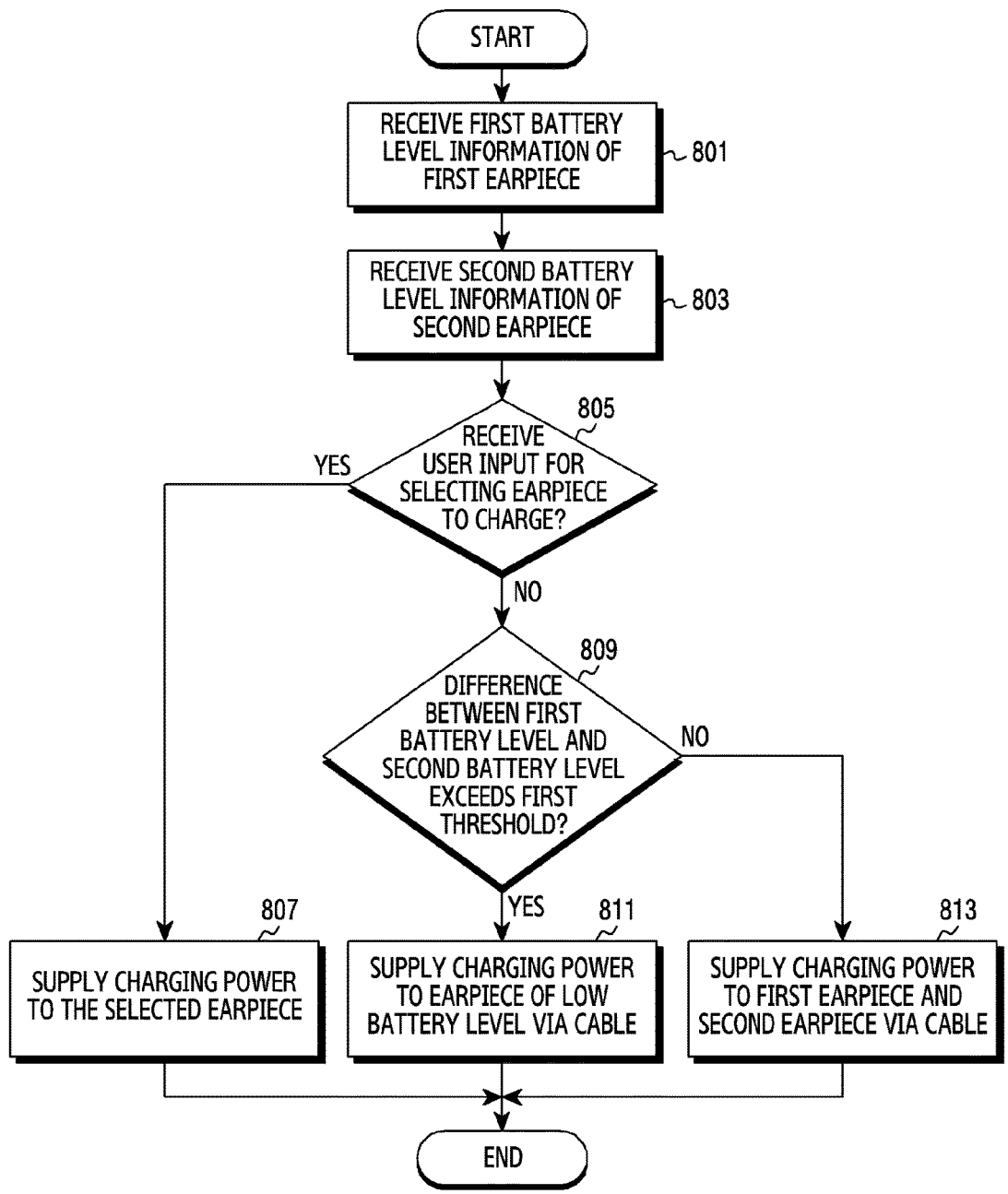
FIG. 8 is a flowchart for illustrating a method for controlling an earpiece according to various embodiments of the present disclosure.

FIG. 8 is a flowchart for illustrating a method for controlling an earpiece according to various embodiments of the present disclosure.

Referring to FIG. 8, in operation 801, the processor 120 may receive first battery level information of the first earpiece 203.

In operation 803, the processor 120 may receive second battery level information of the second earpiece 205.

Operations 801 and 803 of FIG. 8 may be at least in part the same as or similar to operations 701 and 703 of FIG. 7, and thus shall be omitted here.

In operation 805, the processor 120 may identify whether a user input for selecting an earpiece to charge is received. For example, the processor 120 may receive from the user, an input for selecting the earpiece to charge among the first earpiece 203 and the second earpiece 205. The user may want to first charge only the first earpiece 203 which operates as the master to provide more functions to the user.

If receiving the user input for selecting the earpiece to charge in operation 805, the processor 120 may control the power management module 188 to supply the charging power to the earpiece selected by the user input in operation 807.

If not receiving the user input for selecting the earpiece to charge in operation 805, the processor 120 may identify whether a difference between a first battery level and a second battery level exceeds a first threshold in operation 809.

Operations 809 through 813 of FIG. 8 may be at least in part the same as or similar to operations 705 through 709 of FIG. 7, and thus shall be omitted here.

Figure 9:
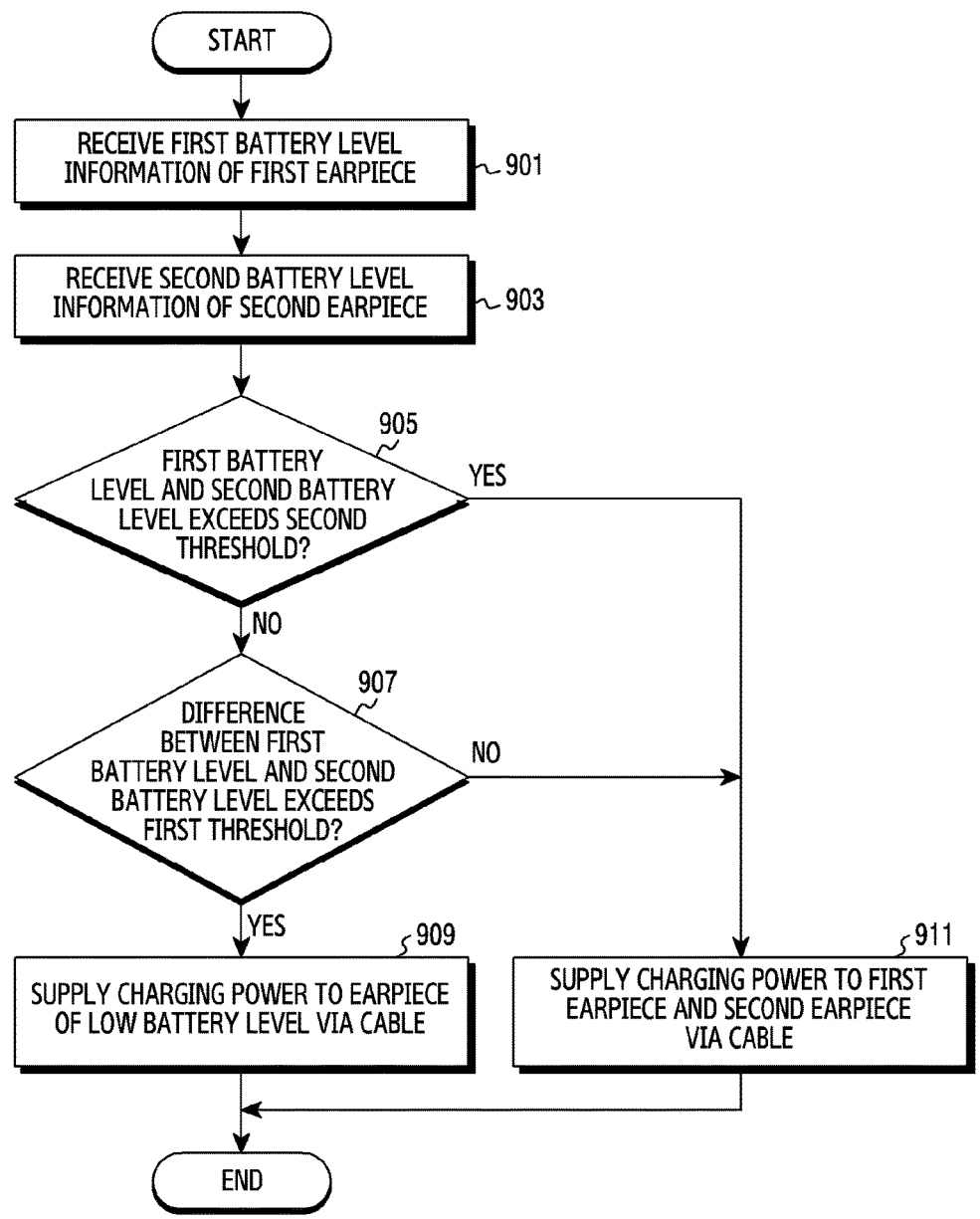
FIG. 9 is a flowchart for illustrating a method for controlling an earpiece according to various embodiments of the present disclosure.

FIG. 9 is a flowchart for illustrating a method for controlling an earpiece according to various embodiments of the present disclosure.

Referring to FIG. 9, in operation 901, the processor 120 may receive first battery level information of the first earpiece 203.

In operation 903, the processor 120 may receive second battery level information of the second earpiece 205.

Operations 901 and 903 of FIG. 9 may be at least in part the same as or similar to operations 701 and 703 of FIG. 7, and thus shall be omitted in detailed descriptions.

In operation 905, the processor 120 may identify whether the first battery level and the second battery level exceeds a second threshold. For example, the processor 120 may identify whether the first battery level and the second battery level exceeds a designated rate (e.g., 50% of the fully charged battery level).

In an embodiment, the processor 120 may vary the second threshold according to whether the electronic device 101 transmits audio data to at least one of the first earpiece 203 or the second earpiece 205 via the wireless communication link or via the wired communication link. For example, if transmitting the audio data to at least one of the first earpiece 203 or the second earpiece 205 via the wireless communication link, the processor 120 may set the second threshold to be smaller than the audio data transmission via the wired communication link.

In an embodiment, if at least one of the first earpiece 203 or the second earpiece 205 performs a function, the processor 120 may set the second threshold to be greater than not performing the function at the first earpiece 203 and the second earpiece 205.

In an embodiment, the processor 120 may set the second threshold, by combining whether the electronic device 101 transmits the audio data to at least one of the first earpiece 203 or the second earpiece 205 via the wireless communication link or via the wired communication link, and whether at least one of the first earpiece 203 or the second earpiece 205 performs the function.

In an embodiment, the processor 120 may set (or change) the second threshold according to a user input. For example, the processor 120 may receive a user input for setting the second threshold. The processor 120 may set the second threshold based at least in part on the user input.

If the first battery level and the second battery level fall below the second threshold in operation 905, the processor 120 may identify whether a difference between the first battery level and the second battery level exceeds a first threshold in operation 907.

If the difference between the first battery level and the second battery level exceeds the first threshold in operation 907, the processor 120 may control the power management module 188 to supply the charging power to the earpiece of the low battery level among the first earpiece 203 and the second earpiece 205 via the cable 310 in operation 909.

If the first battery level and the second battery level exceed the second threshold in operation 905 or if the difference between the first battery level and the second battery level falls below the first threshold in operation 907, the processor 120 may supply the charging power to the first earpiece 203 and the second earpiece 205 via the cable 310 in operation 911.

Operations 907 and 911 of FIG. 9 may be at least in part the same as or similar to operations 705 and 709 of FIG. 7, and thus shall be omitted in detailed descriptions.

Figure 10:
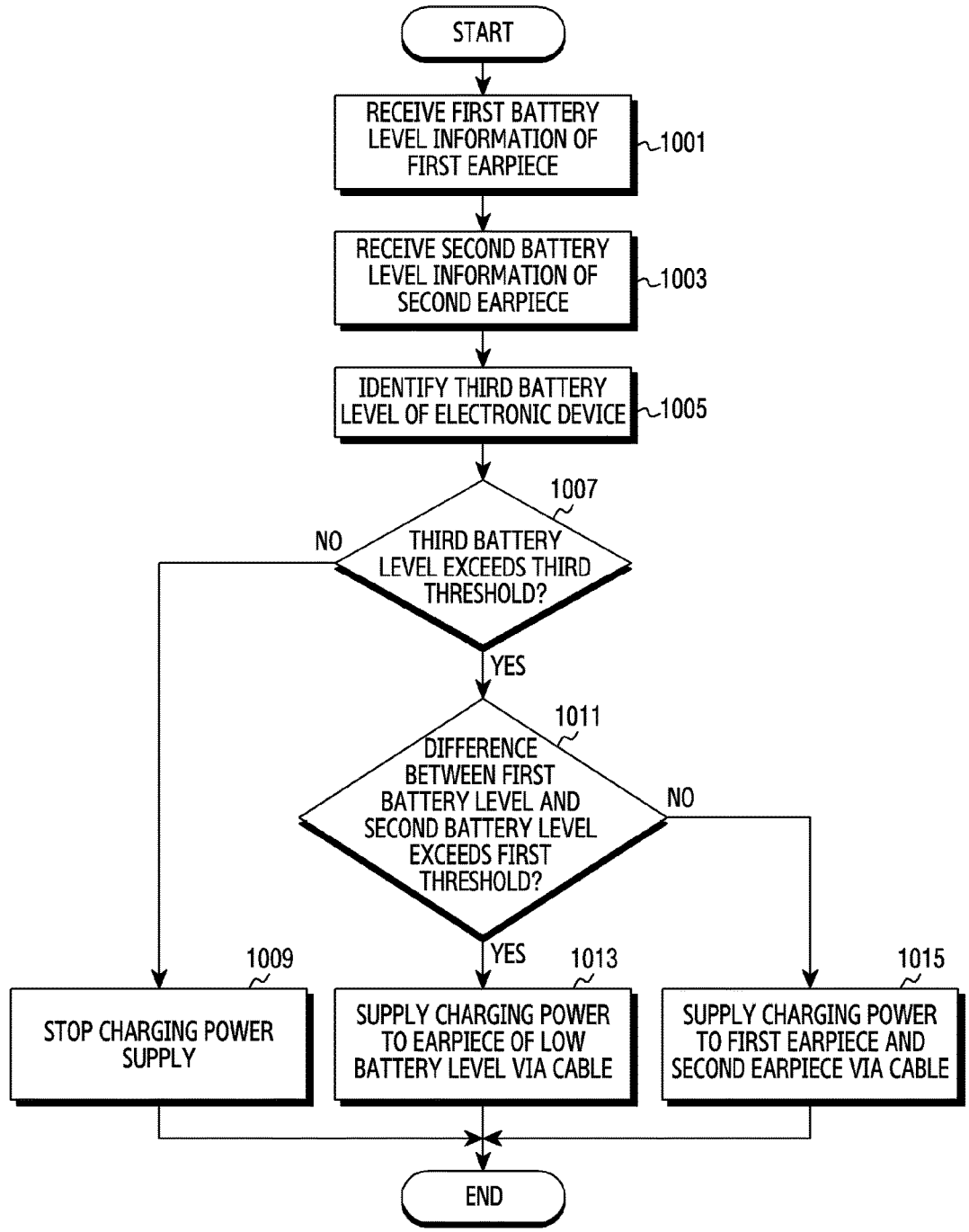
FIG. 10 is a flowchart for illustrating a method for controlling an earpiece according to various embodiments of the present disclosure.

FIG. 10 is a flowchart for illustrating a method for controlling an earpiece according to various embodiments of the present disclosure.

Referring to FIG. 10, in operation 1001, the processor 120 may receive first battery level information of the first earpiece 203.

In operation 1003, the processor 120 may receive second battery level information of the second earpiece 205.

Operations 1001 and 1003 of FIG. 10 may be at least in part the same as or similar to operations 701 and 703 of FIG. 7, and thus shall be omitted in detailed descriptions.

In operation 1005, the processor 120 may identify a third battery level (e.g., the remaining battery amount of the electronic device 101) of the electronic device 101.

For example, the processor 120 may receive remaining battery amount information measured by the battery level measuring circuit, from the battery level measuring circuit (e.g., a fuel gauge).

In operation 1007, the processor 120 may identify whether the third battery level exceeds a third threshold.

In an embodiment, the processor 120 may vary the third threshold based at least in part on an application executed at the electronic device 101. In an embodiment, if power consumed to execute the application at the electronic device 101 exceeds a designated amount, the processor 120 may set (or adjust) the third threshold to increase. For example, if the electronic device 101 executes a music application and transmits audio data to the first earpiece 203 or the second earpiece 205, the processor 120 may identify that power consumed by the audio data transmission exceeds a designated amount and thus increase (or adjust) the third threshold.

In an embodiment, the processor 120 may set (or adjust) the third threshold according to a user input. For example, the processor 120 may receive a user input for setting the third threshold. The processor 120 may set the third threshold based at least in part on the user input.

If the third battery level falls below the third threshold in operation 1007, the processor 120 may stop the charging power supply to at least one of the first earpiece 203 or the second earpiece 205 (or may not supply the charging power to at least one of the first earpiece 203 or the second earpiece 205) in operation 1009.

Although not depicted in FIG. 10, if the third battery level falls below the third threshold while the electronic device 101 transmits the audio data to at least one of the first earpiece 203 or the second earpiece 205, the processor 120 may not supply the charging power to at least one of the first earpiece 203 or the second earpiece 205 and may continuously transmit (or keep transmitting) the audio data to at least one of the first earpiece 203 or the second earpiece 205. In an embodiment, if the third battery level falls below the third threshold, the processor 120 may decrease a quality (e.g., from 192 Kbps to 96 Kbps) of the audio data to transmit to at least one of the first earpiece 203 or the second earpiece 205 and transmit the audio data of the decreased quality to at least one of the first earpiece 203 or the second earpiece 205.

If the third battery level exceeds the third threshold in operation 1007, the processor 120 may identify whether a difference between the first battery level and the second battery level exceeds a first threshold in operation 1011.

If the difference between the first battery level and the second battery level exceeds the first threshold in operation 1011, the processor 120 may control the power management module 188 to supply the charging power to the earpiece of the low battery level among the first earpiece 203 and the second earpiece 205 through the cable 310 in operation 1013.

If the difference between the first battery level and the second battery level falls below the first threshold in operation 1011, the processor 120 may supply the charging power to the first earpiece 203 and the second earpiece 205 through the cable 310 in operation 1015.

Operations 1011 through 1015 of FIG. 10 may be at least in part the same as or similar to operations 705 through 709 of FIG. 7, and thus shall be omitted in detailed descriptions.

Although not depicted in FIG. 10, in an embodiment, if the third battery level exceeds the third threshold in operation 1007, the processor 120 may directly supply the charging power to the first earpiece 203 and the second earpiece 205 through the cable 310 in operation 1015. For example, if the third battery level exceeds the third threshold in operation 1007, the processor 120 may supply the charging power to the first earpiece 203 and the second earpiece 205 through the cable 310 regardless of whether the difference between the first battery level and the second battery level exceeds the first threshold.

Figure 11:
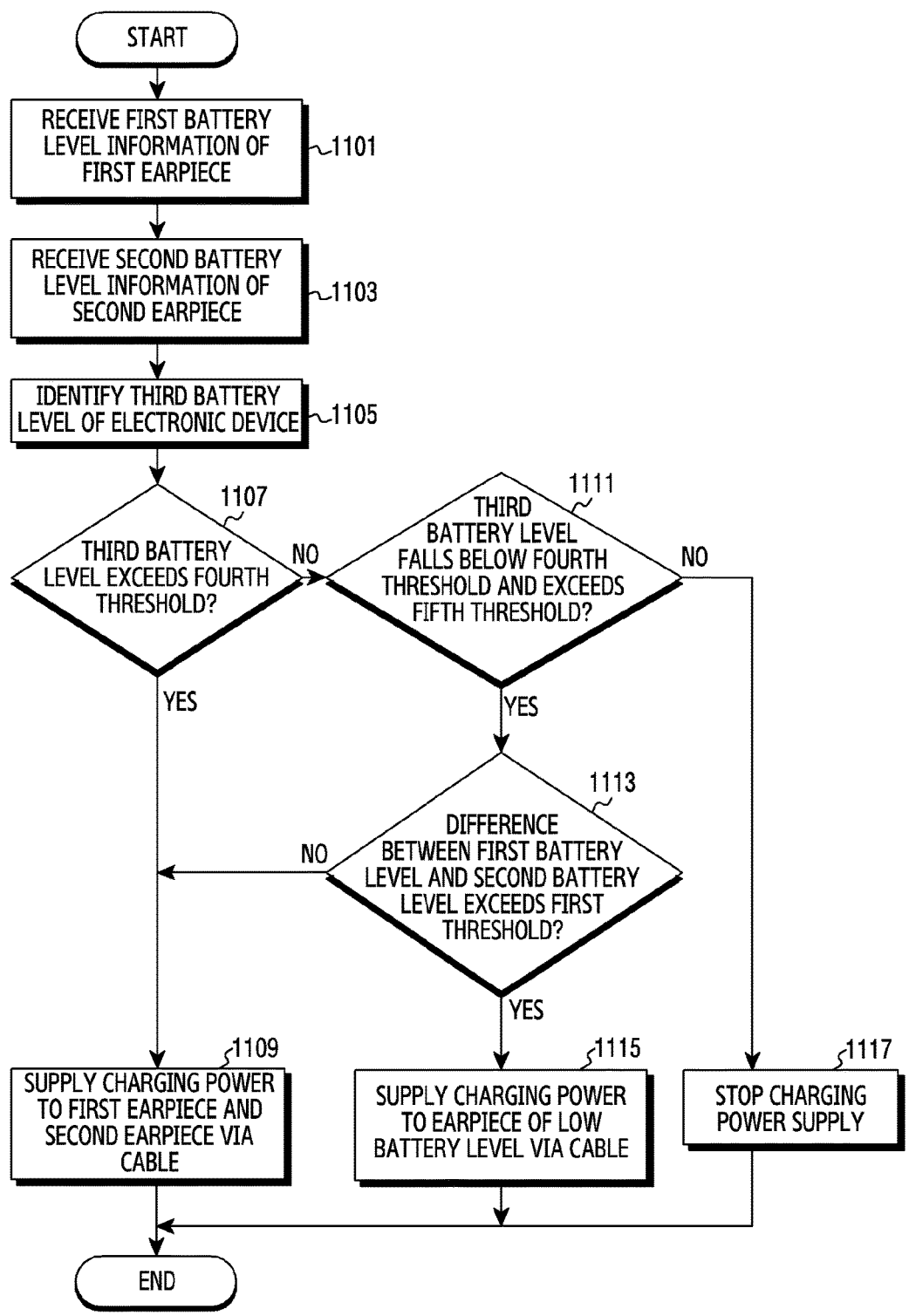
FIG. 11 is a flowchart for illustrating a method for controlling an earpiece according to various embodiments of the present disclosure.

FIG. 11 is a flowchart for illustrating a method for controlling an earpiece according to various embodiments of the present disclosure.

Referring to FIG. 11, in operation 1101, the processor 120 may receive first battery level information of the first earpiece 203.

In operation 1103, the processor 120 may receive second battery level information of the second earpiece 205.

In operation 1105, the processor 120 may identify a third battery level of the electronic device 101.

Operations 1101 through 1105 of FIG. 11 may be at least in part the same as or similar to operations 1001 through 1005 of FIG. 10, and thus shall be omitted in detailed descriptions.

In operation 1107, the processor 120 may identify whether the third battery level exceeds a fourth threshold.

In an embodiment, the processor 120 may vary the fourth threshold based at least in part on an application executed at the electronic device 101. In an embodiment, if the power consumed to execute the application at the electronic device 101 exceeds a designated amount, the processor 120 may increase (or adjust) the fourth threshold.

In an embodiment, the processor 120 may set (or change) the fourth threshold according to a user input. For example, the processor 120 may receive a user input for setting the fourth threshold. The processor 120 may set the fourth threshold based at least in part on the user input.

If the third battery level exceeds the fourth threshold in operation 1107, the processor 120 may supply the charging power to the first earpiece 203 and the second earpiece 205 through the cable 310 in operation 1109.

If the third battery level does not exceed the fourth threshold in operation 1107, the processor 120 may identify whether the third battery level falls below the fourth threshold and exceeds a fifth threshold in operation 1111.

In an embodiment, the fifth threshold may be smaller than the fourth threshold. In an embodiment, the processor 120 may vary the fifth threshold based at least in part on an application executed at the electronic device 101. In an embodiment, if the power consumed to execute the application at the electronic device 101 exceeds a designated amount, the processor 120 may increase (or adjust) the fifth threshold. For example, if the electronic device 101 executes a music application and transmits audio data to the first earpiece 203 or the second earpiece 205, the processor 120 may identify that the power consumed for the audio data transmission exceeds the designated amount, and increase (or adjust) the fifth threshold.

In an embodiment, the processor 120 may set (or change) the fifth threshold according to a user input. For example, the processor 120 may receive a user input for setting the fifth threshold. The processor 120 may set the fifth threshold based at least in part on the user input.

If the third battery level falls below the fourth threshold and exceeds the fifth threshold in operation 1111, the processor 120 may identify whether a difference between the first battery level and the second battery level exceeds a first threshold in operation 1113.

If the difference between the first battery level and the second battery level exceeds the first threshold in operation 1113, the processor 120 may control the power management module 188 to supply the charging power to the earpiece of the low battery level among the first earpiece 203 and the second earpiece 205 through the cable 310 in operation 1115.

If the difference between the first battery level and the second battery level falls below the first threshold in operation 1113, the processor 120 may supply the charging power to the first earpiece 203 and the second earpiece 205 through the cable 310 in operation 1109.

If the third battery level falls below the fifth threshold in operation 1111, the processor 120 may stop the charging power supply to at least one of the first earpiece 203 or the second earpiece 205 in operation 1117.

Figure 12:
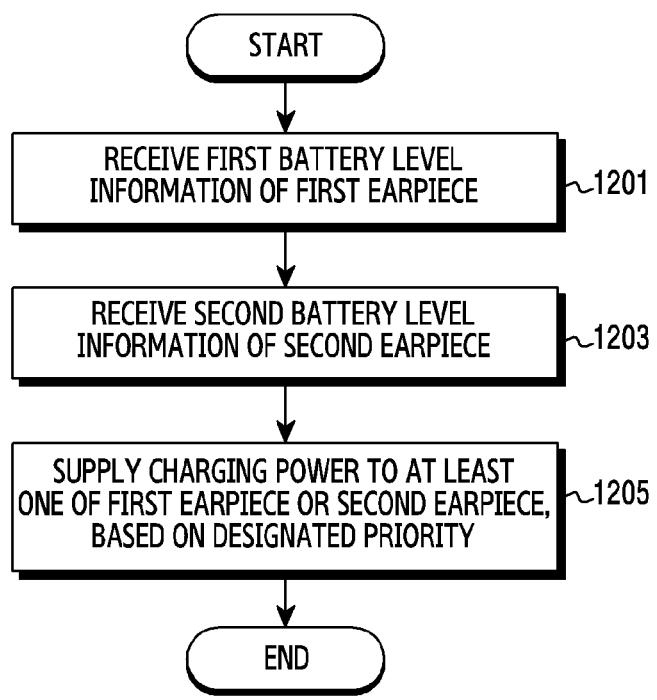
FIG. 12 is a flowchart for illustrating a method for controlling an earpiece according to various embodiments of the present disclosure.

FIG. 12 is a flowchart for illustrating a method for controlling an earpiece according to various embodiments of the present disclosure.

Referring to FIG. 12, in operation 1201, the processor 120 may receive first battery level information (or remaining battery amount information) of the first earpiece 203.

In an embodiment, the processor 120 may receive the first battery level information of the first earpiece 203 via the first wireless communication link 410 or the third wireless communication link 511. In an embodiment, if the electronic device 101 and the first earpiece 203 are connected through the cable 310, the electronic device 101 may receive the first battery level information of the first earpiece 203 via the wired communication link 431 and 531.

Although not depicted in FIG. 12, before receiving the first battery level information of the first earpiece 203 via the first wireless communication link 410 or the third wireless communication link 511, the processor 120 may control the communication module 190 to establish the first wireless communication link 410 or the third wireless communication link 511 between the electronic device 101 and the first earpiece 203.

In operation 1203, the processor 120 may receive second battery level information of the second earpiece 205.

In an embodiment, the processor 120 may receive the second battery level information of the second earpiece 205 from the first earpiece 203 via the first wireless communication link 410. In an embodiment, if receiving the second battery level information of the second earpiece 205 from the second earpiece 205 via the second wireless communication link 420, the processor 120 may receive the second battery level information of the second earpiece 205 from the first earpiece 203 via the first wireless communication link 410.

In an embodiment, the processor 120 may receive the second battery level information of the second earpiece 205 directly from the second earpiece 205 via the fourth wireless communication link 513.

In an embodiment, if the electronic device 101 and the second earpiece 205 are connected through the cable 310, the electronic device 101 may receive the second battery level information of the second earpiece 205 via the wired communication link 433 and 533.

Although not depicted in FIG. 12, before receiving the second battery level information of the second earpiece 205 via the first wireless communication link 410 or the fourth wireless communication link 513, the processor 120 may control the communication module 190 to establish the first wireless communication link 410 between the electronic device 101 and the first earpiece 203 or to establish the fourth wireless communication link 513 between the electronic device 101 and the second earpiece 205.

In operation 1205, the processor 120 may supply the charging power to at least one of the first earpiece 203 or the second earpiece 205, based on a designated priority.

In an embodiment, the processor 120 may control to charge a master earpiece (or the earpiece serving as the master) first among the first earpiece 203 and the second earpiece 205. For example, even if the battery level of the first earpiece 203, which is the master, is higher than the battery level of the second earpiece 205, which is a slave, among the first earpiece 203 and the second earpiece 205, the processor 120 may first charge the first earpiece 203 which is the master over the second earpiece 205 which is the slave.

In an embodiment, the processor 120 may first charge the earpiece of the low battery level among the first earpiece 203 and the second earpiece 205.

In an embodiment, based at least in part on a power consumption condition (or status) (or function execution) of at least one of the first earpiece 203 or the second earpiece 205, the processor 120 may charge at least one of the first earpiece 203 or the second earpiece 205. For example, the processor 120 may identify that the first earpiece 203 performs a function (e.g., a voice call function, an audio data output function, etc.) and the second earpiece 205 is standing by (or sleeping). The processor 120 may first charge the first earpiece 203 which performs the function over the second earpiece 205 which is standing by.

In an embodiment, the processor 120 may control the power management module 188 to supply the charging power first to the earpiece of a high priority via the cable 310, based on the designated priority, using the quick charging scheme (or the normal charging scheme).

In an embodiment, the processor 120 may control the power management module 188 to fully charge the earpiece of the high priority by supplying the charging power first to the earpiece of the high priority, and then to supply the charging power to the earpiece of the battery level of the low priority.

In an embodiment, the processor 120 may control the power management module 188 to fully charge the earpiece of the low battery level by supplying the charging power first to the earpiece of the low battery level, and then to supply the charging power to the earpiece of the high battery level.

In an embodiment, the processor 120 may control the power management module 188 to supply the charging power first to the earpiece of the high priority and then, if the earpiece of the high priority reaches a designated battery level, to charge the earpiece of the low priority.

In an embodiment, if the charging power is supplied first to one, with the high priority, of the first earpiece 203 and the second earpiece 205 and then the earpiece of the high priority reaches the battery level of the earpiece of the low priority (or equals the battery level of the earpiece of the low priority), the processor 120 may control the power management module 188 to supply the charging power to the high-priority earpiece and the low-priority earpiece in order to charge both of the high-priority earpiece and the low-priority earpiece.

In an embodiment, if the same priority (e.g., the first earpiece 203 and the second earpiece 205 do not execute functions) or no priority is assigned to the first earpiece 203 and the second earpiece 205, the processor 120 may control the power management module 188 to supply the charging power to both of the first earpiece 203 and the second earpiece 205 through the cable 310.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the normal charging scheme.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the quick charging scheme.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the quick charging scheme until the battery level of at least one of the first earpiece 203 or the second earpiece 205 reaches a designated battery level, and to supply the charging power using the normal charging scheme if the battery level reaches the designated battery level.

Figure 13:
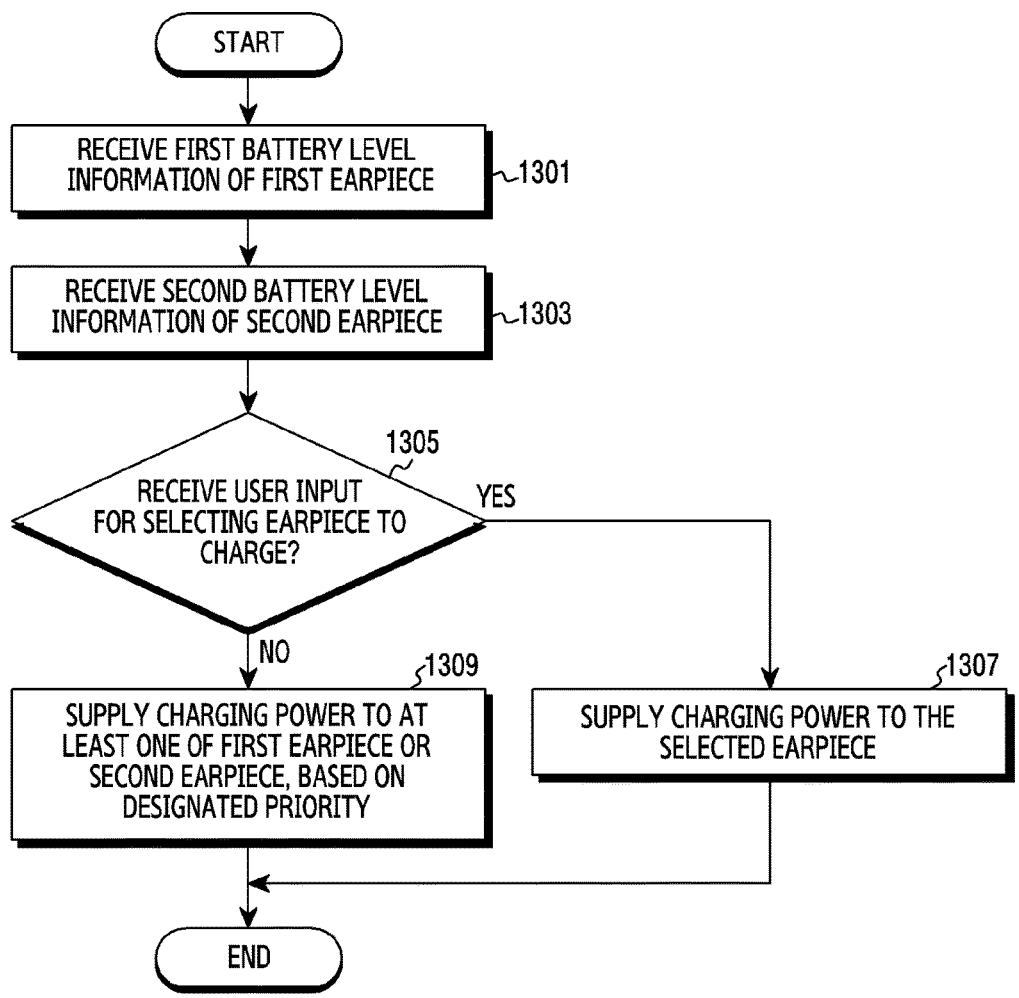
FIG. 13 is a flowchart for illustrating a method for controlling an earpiece according to various embodiments of the present disclosure.

FIG. 13 is a flowchart for illustrating a method for controlling an earpiece according to various embodiments of the present disclosure.

Referring to FIG. 13, in operation 1301, the processor 120 may receive first battery level information of the first earpiece 203.

In operation 1303, the processor 120 may receive second battery level information of the second earpiece 205.

Operations 1301 and 1303 of FIG. 13 may be at least in part the same as or similar to operations 1201 and 1203 of FIG. 12, and thus shall be omitted in detailed descriptions.

In operation 1305, the processor 120 may identify whether a user input for selecting an earpiece to charge is received. For example, the processor 120 may receive from the user, an input for selecting the earpiece to charge among the first earpiece 203 and the second earpiece 205. The user may want to charge only the first earpiece 203 which operates as the master to provide more functions to the user.

If receiving the user input for selecting the earpiece to charge in operation 1305, the processor 120 may control the power management module 188 to supply the charging power to the earpiece selected by the user input in operation 1307.

If not receiving the user input for selecting the earpiece to charge in operation 1305, the processor 120 may supply the charging power to at least one of the first earpiece 203 or the second earpiece 205, based on a designated priority in operation 1309.

Operations 1309 of FIG. 13 may be at least in part the same as or similar to operations 1205 of FIG. 12, and thus shall be omitted in detailed descriptions.

Figure 14:
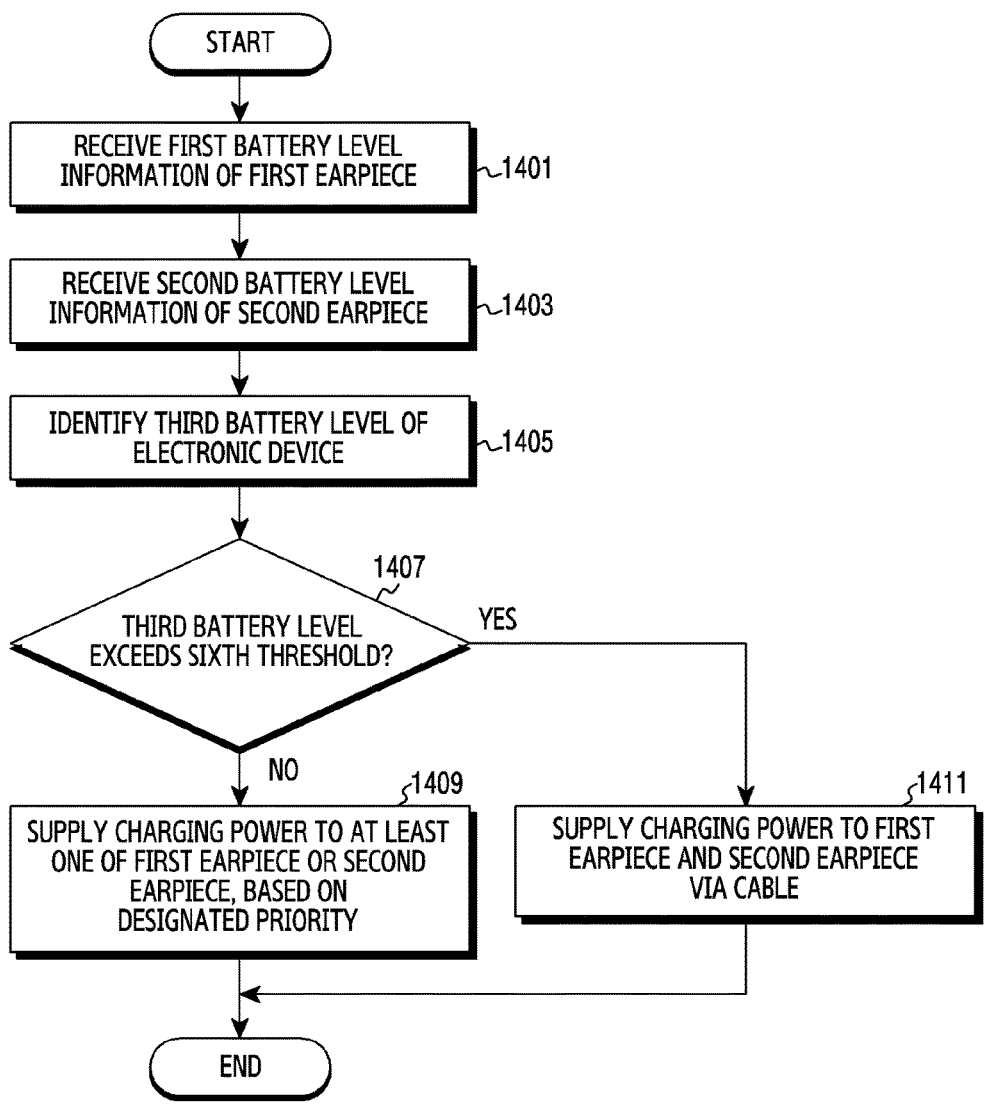
FIG. 14 is a flowchart for illustrating a method for controlling an earpiece according to various embodiments of the present disclosure.

FIG. 14 is a flowchart for illustrating a method for controlling an earpiece according to various embodiments of the present disclosure.

Referring to FIG. 14, in operation 1401, the processor 120 may receive first battery level information of the first earpiece 203.

In operation 1403, the processor 120 may receive second battery level information of the second earpiece 205.

Operations 1401 and 1403 of FIG. 14 may be at least in part the same as or similar to operations 1201 and 1203 of FIG. 12, and thus shall be omitted in detailed descriptions.

In operation 1405, the processor 120 may identify a third battery level (e.g., the remaining battery amount of the electronic device 101) of the electronic device 101.

For example, the processor 120 may receive remaining battery amount information measured by the battery level measuring circuit, from the battery level measuring circuit (e.g., a fuel gauge).

In operation 1407, the processor 120 may identify whether the third battery level exceeds a sixth threshold.

In an embodiment, the processor 120 may vary the sixth threshold based at least in part on an application executed at the electronic device 101. In an embodiment, if power consumed to execute the application at the electronic device 101 exceeds a designated amount, the processor 120 may set (or adjust) the sixth threshold to increase. For example, if the electronic device 101 executes a music application and transmits audio data to the first earpiece 203 or the second earpiece 205, the processor 120 may identify that the power consumed for the audio data transmission exceeds a designated amount, and thus increase (or adjust) the sixth threshold.

In an embodiment, the processor 120 may set (or adjust) the sixth threshold according to a user input. For example, the processor 120 may receive a user input for setting the sixth threshold. The processor 120 may set the sixth threshold based at least in part on the user input.

If the third battery level falls below the sixth threshold in operation 1407, the processor 120 may supply the charging power to at least one of the first earpiece 203 or the second earpiece 205, based on a designated priority in operation 1409.

Although not depicted in FIG. 14, if the third battery level falls below the sixth threshold, the processor 120 may stop the charging power supply to at least one of the first earpiece 203 or the second earpiece 205 (or may not supply the charging power to at least one of the first earpiece 203 or the second earpiece 205). In an embodiment, if the third battery level falls below the sixth threshold while the electronic device 101 transmits the audio data to at least one of the first earpiece 203 or the second earpiece 205, the processor 120 may not supply the charging power to at least one of the first earpiece 203 or the second earpiece 205 and may continuously transmit (or keep transmitting) the audio data to at least one of the first earpiece 203 or the second earpiece 205. In an embodiment, if the third battery level falls below the sixth threshold, the processor 120 may reduce a quality (e.g., from 192 Kbps to 96 Kbps) of the audio data to transmit to at least one of the first earpiece 203 or the second earpiece 205 and transmit the audio data of the reduced quality to at least one of the first earpiece 203 or the second earpiece 205.

If the third battery level exceeds the sixth threshold in operation 1407, the processor 120 may supply the charging power to both of the first earpiece 203 and the second earpiece 205 via the cable 310 in operation 1411.

Figure 15:
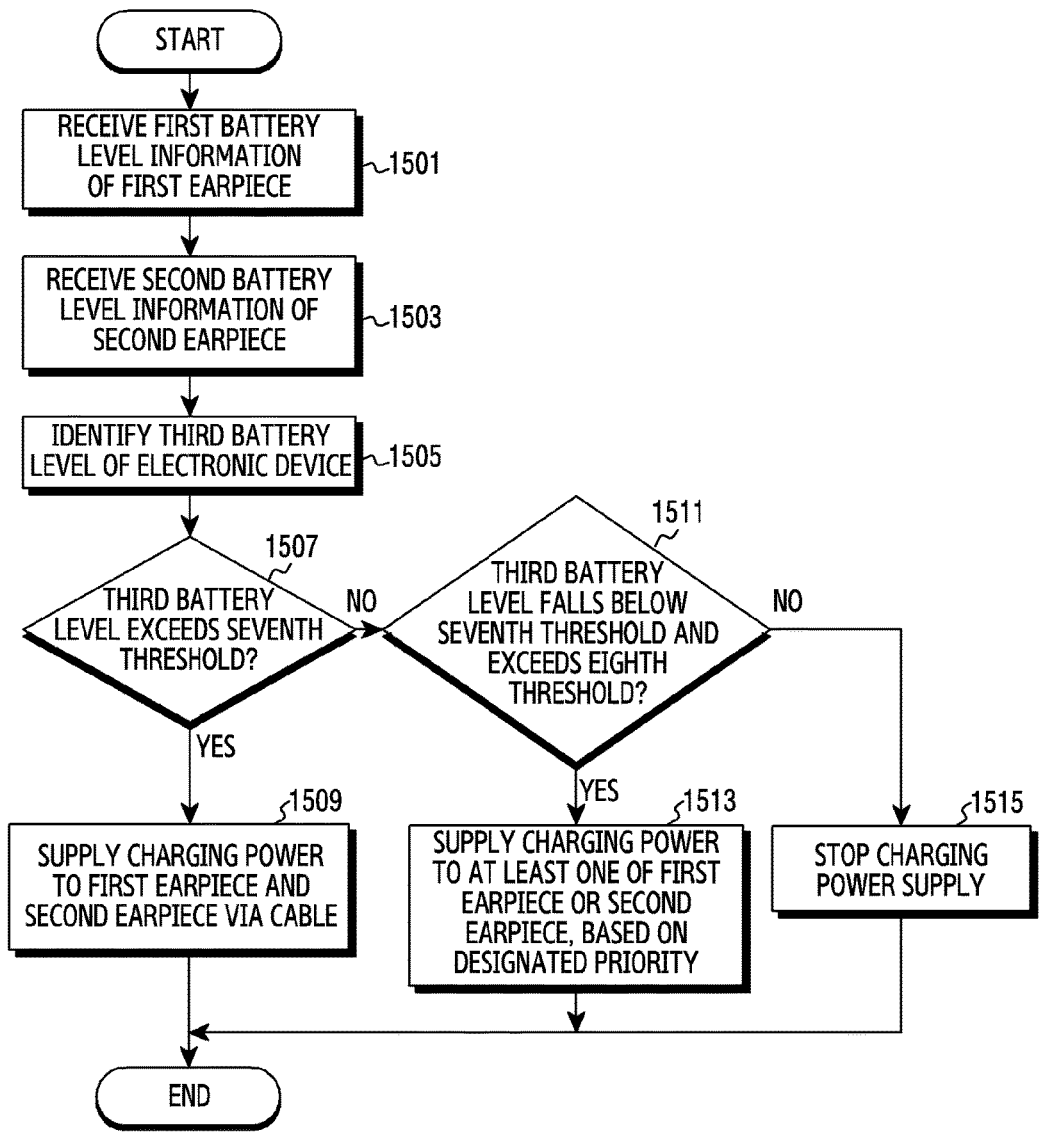
FIG. 15 is a flowchart for illustrating a method for controlling an earpiece according to various embodiments of the present disclosure.

FIG. 15 is a flowchart for illustrating a method for controlling an earpiece according to various embodiments of the present disclosure.

Referring to FIG. 15, in operation 1501, the processor 120 may receive first battery level information of the first earpiece 203.

In operation 1503, the processor 120 may receive second battery level information of the second earpiece 205.

In operation 1505, the processor 120 may identify a third battery level of the electronic device 101.

Operations 1501 through 1505 of FIG. 15 may be at least in part the same as or similar to operations 1401 through 1405 of FIG. 14, and thus shall be omitted in detailed explanations.

In operation 1507, the processor 120 may identify whether the third battery level exceeds a seventh threshold.

In an embodiment, the processor 120 may vary the seventh threshold based at least in part on an application executed at the electronic device 101. In an embodiment, if power consumed to execute the application at the electronic device 101 exceeds a designated amount, the processor 120 may increase (or adjust) the seventh threshold.

In an embodiment, the processor 120 may set (or adjust) the seventh threshold according to a user input. For example, the processor 120 may receive a user input for setting the seventh threshold. The processor 120 may set the seventh threshold based at least in part on the user input.

If the third battery level exceeds the seventh threshold in operation 1507, the processor 120 may supply the charging power to the first earpiece 203 and the second earpiece 205 through the cable 310 in operation 1509.

If the third battery level does not exceed the seventh threshold in operation 1507, the processor 120 may identify whether the third battery level falls below the seventh threshold and exceeds an eighth threshold in operation 1511.

In an embodiment, the eighth threshold may be smaller than the seventh threshold. In an embodiment, the processor 120 may vary the eighth threshold based at least in part on an application executed at the electronic device 101. In an embodiment, if the power consumed to execute the application at the electronic device 101 exceeds the designated amount, the processor 120 may increase (or adjust) the eighth threshold. For example, if the electronic device 101 executes a music application and transmits audio data to the first earpiece 203 or the second earpiece 205, the processor 120 may identify that the power consumed for the audio data transmission exceeds the designated amount, and increase (or adjust) the eighth threshold.

In an embodiment, the processor 120 may set (or change) the eighth threshold according to a user input. For example, the processor 120 may receive a user input for setting the eighth threshold. The processor 120 may set the eighth threshold based at least in part on the user input.

If the third battery level falls below the seventh threshold and exceeds the eighth threshold in operation 1511, the processor 120 may supply the charging power to at least one of the first earpiece 203 or the second earpiece 205, based on a designated priority in operation 1513.

In an embodiment, the processor 120 may charge first a master earpiece (or the earpiece serving as the master) among the first earpiece 203 and the second earpiece 205. In an embodiment, the processor 120 may first charge the earpiece of the low battery level among the first earpiece 203 and the second earpiece 205. In an embodiment, based at least in part on a power consumption condition (or status) (or function execution) of at least one of the first earpiece 203 or the second earpiece 205, the processor 120 may charge at least one of the first earpiece 203 or the second earpiece 205. In an embodiment, the processor 120 may control the power management module 188 to supply the charging power first to an earpiece of a high priority via the cable 310, based on the designated priority, using the quick charging scheme (or the normal charging scheme).

In an embodiment, the processor 120 may control the power management module 188 to fully charge the earpiece of the high priority by supplying the charging power first to the earpiece of the high priority, and then to supply the charging power to the earpiece of the battery level of the low priority.

In an embodiment, the processor 120 may control the power management module 188 to fully charge the earpiece of the low battery level by supplying the charging power first to the earpiece of the low battery level, and then to supply the charging power to the earpiece of the high battery level.

In an embodiment, the processor 120 may control the power management module 188 to supply the charging power first to the earpiece of the high priority and then, if the earpiece of the high priority reaches a designated battery level, to supply the charging power to the earpiece of the low priority.

In an embodiment, if the charging power is supplied first to one, with the high priority, of the first earpiece 203 and the second earpiece 205 and then the earpiece of the high priority reaches the battery level of the earpiece of the low priority (or equals the battery level of the earpiece of the low priority), the processor 120 may control the power management module 188 to supply the charging power to the high-priority earpiece and the low-priority earpiece in order to charge both of the high-priority earpiece and the low-priority earpiece.

In an embodiment, if the same priority (e.g., the first earpiece 203 and the second earpiece 205 do not execute functions) or no priority is assigned to the first earpiece 203 and the second earpiece 205, the processor 120 may control the power management module 188 to supply the charging power to both of the first earpiece 203 and the second earpiece 205 through the cable 310.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the normal charging scheme.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the quick charging scheme.

In an embodiment, if supplying the charging power to both of the first earpiece 203 and the second earpiece 205 through the cable 310, the processor 120 may control the power management module 188 to supply the charging power to the first earpiece 203 and the second earpiece 205 through the cable 310 using the quick charging scheme until at least one of the first earpiece 203 or the second earpiece 205 reaches a designated battery level, and to supply the charging power using the normal charging scheme if the battery level reaches the designated battery level.

If the third battery level falls below the eighth threshold in operation 1511, the processor 120 may stop the charging power supply to at least one of the first earpiece 203 or the second earpiece 205 in operation 1515.

Figure 16:
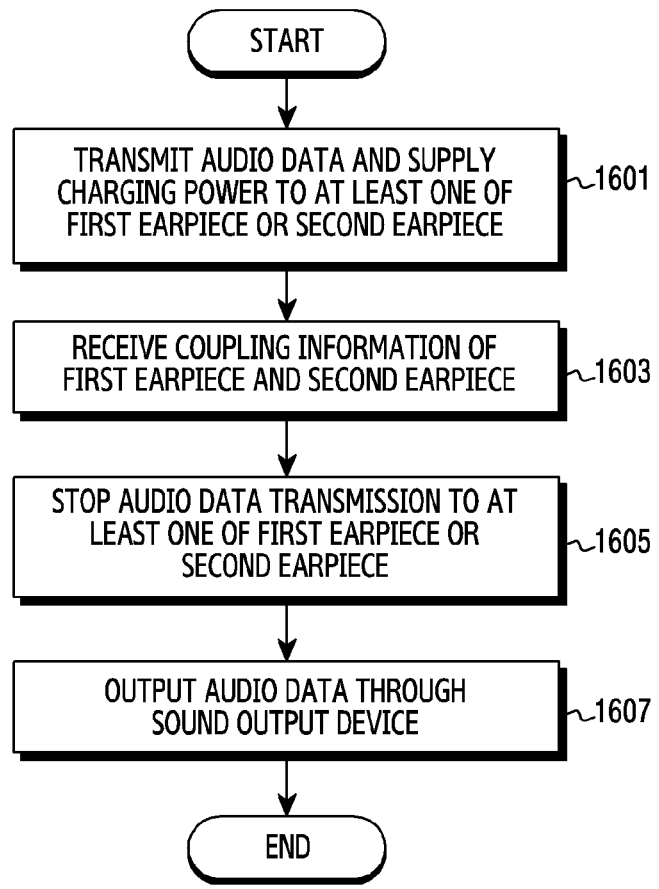
FIG. 16 is a flowchart for illustrating operations if a first earpiece and a second earpiece are coupled according to various embodiments of the present disclosure.

FIG. 16 is a flowchart for illustrating operations if a first earpiece and a second earpiece are coupled according to various embodiments of the present disclosure.

Referring to FIG. 16, in operation 1601, the processor 120 may transmit audio data and supply the charging power to at least one of the first earpiece 203 or the second earpiece 205.

In an embodiment, the processor 120 may transmit the audio data to at least one of the first earpiece 203 or the second earpiece 205, via at least one of the first wireless communication link 410, the third wireless communication link 511, the fourth wireless communication link 513, or the wired communication link 431, 433, 531, or 533. The transmitted audio data may be outputted from at least one of the first earpiece 203 or the second earpiece 205.

In an embodiment, the processor 120 may supply the charging power to at least one of the first earpiece 203 or the second earpiece 205 via the cable 310.

In operation 1603, the processor 120 may receive coupling information of the first earpiece 203 (or a coupling unit (e.g., the coupling unit 230) of the first earpiece 203) and the second earpiece 205 (or a coupling unit of the second earpiece 205). For example, the processor 120 may receive the coupling information of the first earpiece 203 and the second earpiece 205 via the first wireless communication link 410. For example, the processor 120 may receive the coupling information of the first earpiece 203 and the second earpiece 205 via the third wireless communication link 511 or the fourth wireless communication link 513. For example, if the electronic device 101 is connected with at least one of the first earpiece 203 or the second earpiece 205 via the cable 310, the processor 120 may receive the coupling information of the first earpiece 203 and the second earpiece 205 via the cable 310.

In operation 1605, the processor 120 may stop the audio data transmission to at least one of the first earpiece 203 or the second earpiece 205. For example, the processor 120 may, but not limited to, not transmit the audio data to the first earpiece 203 and the second earpiece 205. For example, if at least one of the first earpiece 203 or the second earpiece 205 outputs the audio data, the processor 120 may transmit control information for stopping the audio data output of at least one of the first earpiece 203 or the second earpiece 205, to at least one of the first earpiece 203 or the second earpiece 205.

In operation 1607, the processor 120 may output the audio data through the sound output device 155. For example, the processor 120 may output the audio data through the speaker of the electronic device 101.

Although not depicted in FIG. 16, in an embodiment, if receiving the coupling information of the first earpiece 203 and the second earpiece 205, the processor 120 may output a notification (e.g., a message) received at the electronic device 101 from outside or a notification (e.g., an alarm) generating in the electronic device 101, through the sound output device 155.

Figure 17:
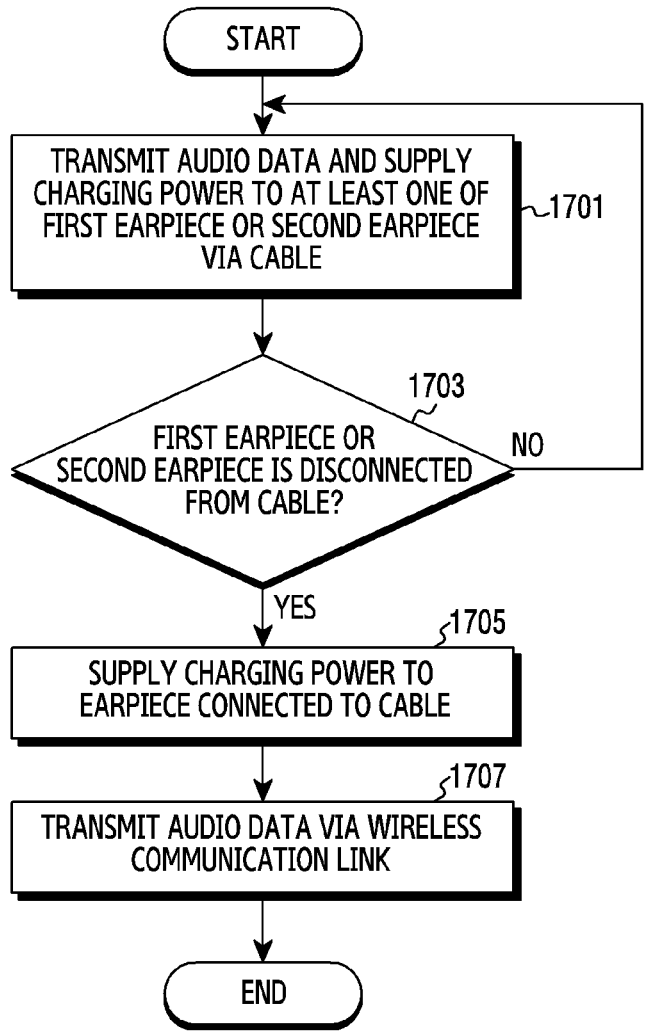
FIG. 17 is a flowchart for illustrating operations if a first earpiece and a second earpiece are disconnected from a cable according to various embodiments of the present disclosure.

FIG. 17 is a flowchart for illustrating operations if a first earpiece and a second earpiece are disconnected from a cable according to various embodiments of the present disclosure.

Referring to FIG. 17, in operation 1701, the processor 120 may transmit audio data to the first earpiece 203 and the second earpiece 205 via the cable 310 and supply the charging power to the first earpiece 203 and the second earpiece 205 via the cable 310.

In operation 1703, the processor 120 may identify whether the first earpiece 203 or the second earpiece 205 is disconnected (or detached) from the cable 310. For example, while maintaining the connection between the connector of the electronic device 101 and the interface 313 of the cable 310, the processor 120 may identify whether the interface 311 of the cable 310 is disconnected from the interface unit of the first earpiece 203 or the second earpiece 205.

If the first earpiece 203 or the second earpiece 205 is not disconnected from (or is still connected to) the cable 310 in operation 1703, the processor 120 may continue operation 1701.

If the first earpiece 203 or the second earpiece 205 is disconnected from the cable 310 in operation 1703, the processor 120 may supply the charging power to the earpiece being connected to the cable 310 in operation 1705. For example, if the first earpiece 203 and the second earpiece 205 are disconnected from the electronic device 101 via the cable 310, the processor 120 may control the power management module to supply the charging power to the second earpiece 205.

In operation 1707, the processor 120 may transmit audio data via the wireless communication link.

In an embodiment, if the first earpiece 203 or the second earpiece 205 is disconnected from the cable 310 while transmitting the audio data to the first earpiece 203 and the second earpiece 205 via the wired communication link (or the cable 310), the processor 120 may transmit the audio data to the first earpiece 203 and the second earpiece 205 via (or by switching from the wired communication link to the wireless communication link) the wireless communication link (e.g., the first wireless communication link 410, the third wireless communication link 511, and the fourth wireless communication link 513). Even if any one of the first earpiece 203 or the second earpiece 205 is disconnected from the cable 310, the processor 120 may transmit the audio data to the first earpiece 203 and the second earpiece 205 via the wireless communication link, thus providing uninterrupted music to the user.

In an embodiment, if the first earpiece 203 or the second earpiece 205 is detached from (is not worn in) the user's body (e.g., the ear), the processor 120 may transmit audio data only to the earpiece which is worn, rather than transmitting the audio data to the detached earpiece. For example, the earpiece 200 may identify whether the earpiece 200 is detached from the user's body, using the sensor unit 250, for example, at least one of an HRM sensor, an electromyogram sensor, a temperature sensor, a proximity sensor, or a biometric sensor. If receiving from the earpiece 200 information indicating that the earpiece 200 is detached from the user's body, the processor 120 may not transmit the audio data to the earpiece detached from the user's body. If receiving from the earpiece 200 information indicating that the earpiece 200 is worn in the user's body, the processor 120 may transmit the audio data to the earpiece which is still worn in the user's body.

Figure 18:
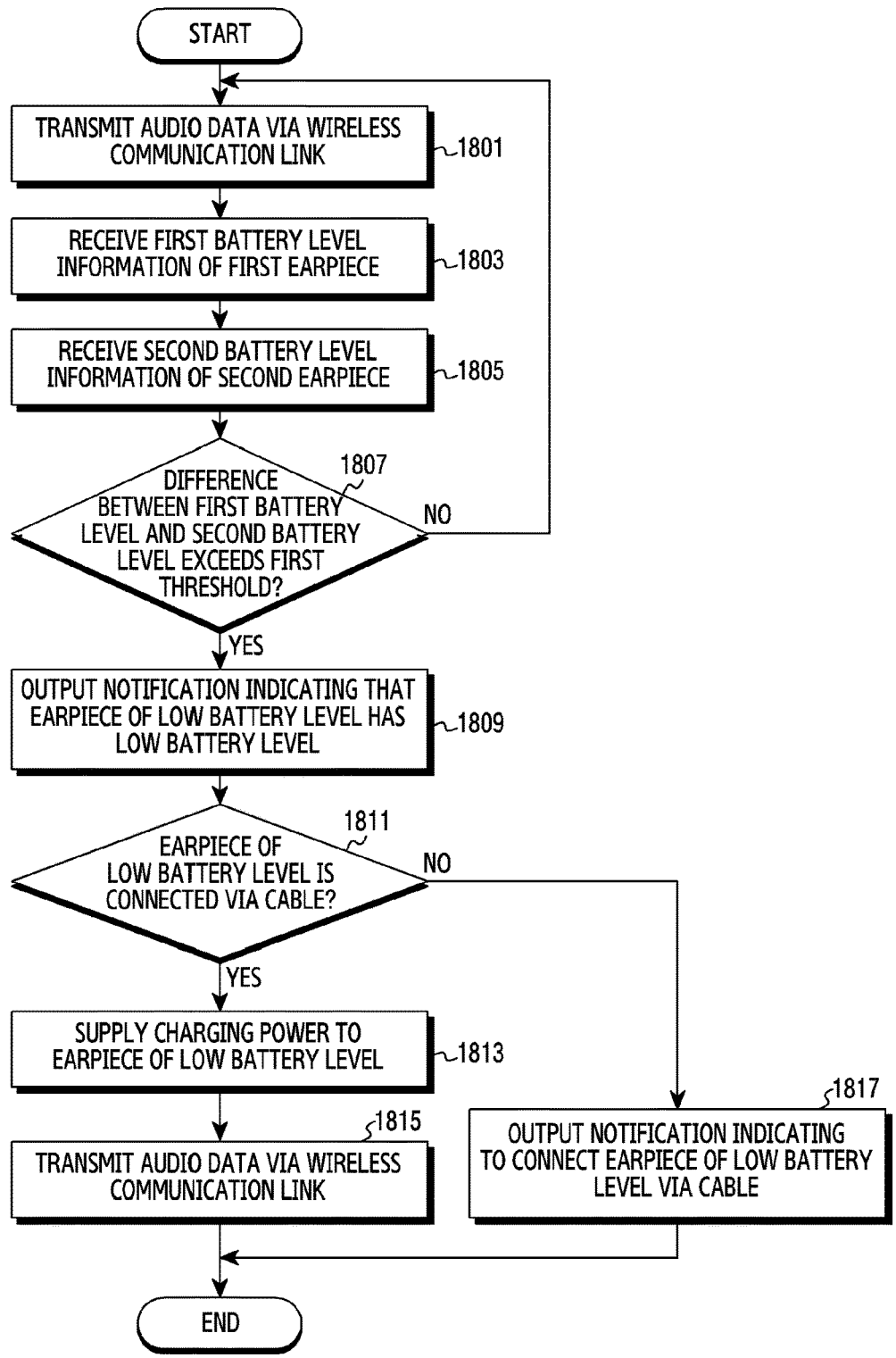
FIG. 18 is a flowchart for illustrating operations for connecting a first earpiece or a second earpiece with a cable according to various embodiments of the present disclosure.

FIG. 18 is a flowchart for illustrating operations for connecting a first earpiece or a second earpiece with a cable according to various embodiments of the present disclosure.

Referring to FIG. 18, in operation 1801, the processor 120 may transmit audio data to the first earpiece 203 and the second earpiece 205 via a wireless communication link. For example, while the electronic device 101 is not connected with the first earpiece 203 and the second earpiece 205 via the cable 310, the processor 120 may transmit the audio data to the first earpiece 203 and the second earpiece 205 via the first wireless communication link 410 or the third wireless communication link 511 and the fourth wireless communication link 513. In an embodiment, with the first earpiece 203 and the second earpiece 205 worn in a user's body, the processor 120 may transmit the audio data to the first earpiece 203 and the second earpiece 205 via the wireless communication link.

In operation 1803, the processor 120 may receive first battery level information of the first earpiece 203.

In operation 1805, the processor 120 may receive second battery level information of the second earpiece 205.

Operations 1803 and 1805 of FIG. 18 may be at least in part the same as or similar to operations 701 and 703 of FIG. 10, and thus shall be omitted in detailed descriptions.

In FIG. 18, operations 1801 and 1803, but not limited to, proceed operation 1805. For example, operation 1801 may follow operations 1803 and 1805.

In operation 1807, the processor 120 may identify whether a difference between the first battery level and the second battery level exceeds a first threshold.

Operation 1807 of FIG. 18 may be at least in part the same as or similar to operation 705 of FIG. 7, and thus its detailed descriptions shall be omitted here.

If the difference between the first battery level and the second battery level falls below the first threshold in operation 1807, the processor 120 may perform operation 1801.

Notably, operation 1807 may be omitted according to embodiments.

If the difference between the first battery level and the second battery level exceeds the first threshold in operation 1807, the processor 120 may output a notification indicating that the earpiece of the low battery level has the low battery level in operation 1809.

In an embodiment, the processor 120 may output a notification regarding the earpiece of the low battery level among the first earpiece 203 and the second earpiece 205. For example, if the first earpiece 203 has a lower battery level than the second earpiece 205, the processor 120 may output indication, vibration, light, or sound indicative of the low battery level of the first earpiece 203.

Notably, operation 1809 may be omitted according to embodiments.

In operation 1811, the processor 120 may identify whether the earpiece of the low battery level is connected via the cable 310.

For example, the processor 120 may identify (or detect) whether the first earpiece 203 of the low battery level is connected to the electronic device 101 via the cable 310 or the second earpiece 205 of the high battery level is connected to the electronic device 101 via the cable 310.

If the earpiece of the low battery level is connected via the cable 310 in operation 1811, the processor 120 may supply the charging power to the earpiece of the low battery level in operation 1813.

Although not depicted in FIG. 18, even if both of the earpiece of the low battery level and the earpiece of the high battery level are connected via the cable 310, the processor 120 may supply the charging power to the earpiece of the low battery level.

Operation 1813 of FIG. 18 may be at least in part the same as or similar to operation 707 of FIG. 7, and thus its detailed descriptions shall be omitted here.

In operation 1815, the processor 120 may transmit audio data via the wireless communication link.

Operation 1815 of FIG. 18 may be at least in part the same as or similar to operation 1707 of FIG. 17, and thus its detailed descriptions shall be omitted here.

If the earpiece of the low battery level is not connected via the cable 310 in operation 1811, the processor 120 may output a notification indicating to connect the earpiece of the low battery level via the cable 310 in operation 1817.

For example, if the earpiece of the high battery level is connected via the cable 310, the processor 120 may output indication, vibration, light, or sound indicating to connect the earpiece of the low battery level via the cable 310.

Although not depicted in FIG. 18, after outputting the notification indicating to connect the earpiece of the low battery level via the cable 310 in operation 1817, the processor 120 may identify whether the earpiece of the low battery level is connected via the cable 310 back in operation 1811.

Figure 19:
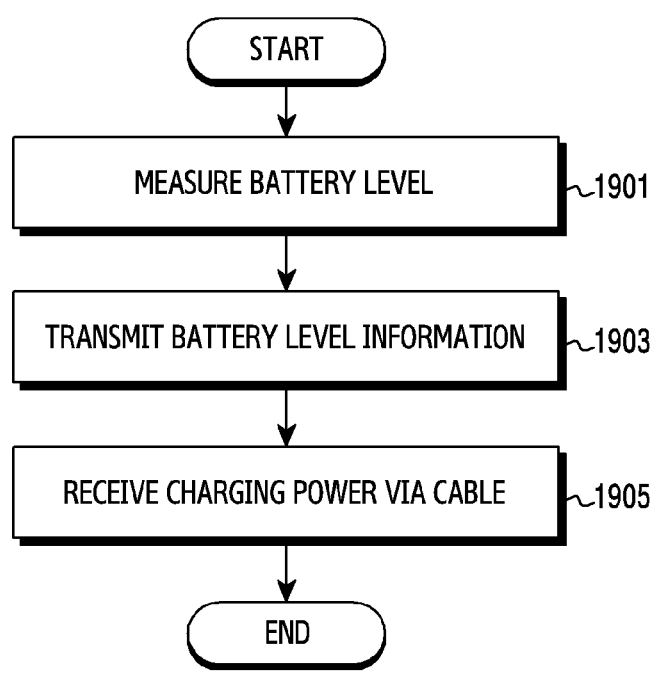
FIG. 19 is a flowchart for illustrating operations of an earpiece according to various embodiments of the present disclosure.

FIG. 19 is a flowchart for illustrating operations of an earpiece according to various embodiments of the present disclosure.

Referring to FIG. 19, the operations of FIG. 19 may be conducted at at least one of the first earpiece 203 or the second earpiece 205.

In operation 1901, the processor 290 may measure a battery level through the battery level measuring circuit 285. The battery level measuring circuit 285 (e.g., a fuel gauge) may measure information about the battery 289. In an embodiment, the information of the battery 289 may include a remaining amount, a voltage, a current, or a temperature of the battery 289. In an embodiment, the battery level measuring circuit 285 may measure the information of the battery 289, based on a signal received along an electrical path connected to the battery 289. In an embodiment, the processor 290 may receive (or obtain) the measured battery level information from the battery level measuring circuit 285.

In operation 1903, the processor 290 may transmit the battery level information to the electronic device 101.

In an embodiment, if the earpiece 200 is the first earpiece 203, the processor 290 may transmit first battery level information and second battery level information of the first earpiece 203 to the electronic device 101 via the first wireless communication link 410. If the earpiece 200 is the first earpiece 203, the processor 290 may receive the second battery level information from the second earpiece 205 via the second wireless communication link 420. If the earpiece 200 is the first earpiece 203, the processor 290 may transmit the first battery level information and the second battery level information to the electronic device 101 via the first wireless communication link 410.

In an embodiment, the first earpiece 203 and the second earpiece 205 may transmit the battery level information to the electronic device 101 via the third wireless communication link 511 and the fourth wireless communication link 513 respectively.

In an embodiment, if the first earpiece 203 and the second earpiece 205 are connected with the electronic device 101 via the cable 310, the first earpiece 203 and the second earpiece 205 may transmit the first battery level information and the second battery level information to the electronic device 101 via the wired communication link 431, 433, 531, and 533.

In operation 1905, the earpiece 200 may receive the charging power from the electronic device 101 via the cable 310.

For example, if the earpiece 200 is the earpiece of the low battery level among the first earpiece 203 and the second earpiece 205, the earpiece 200 may receive the charging power from the electronic device 101 using the quick charging scheme. If the earpiece 200 is the earpiece of the high battery level among the first earpiece 203 and the second earpiece 205, the earpiece 200 may not receive the charging power from the electronic device 101.

For example, the first earpiece 203 and the second earpiece 205 may receive the charging power from the electronic device 101 at the same time.

In an embodiment, if receiving the charging power from the electronic device 101, the earpiece 200 may supply the received power to the battery 289 through the charging circuit 283.

Figure 20:
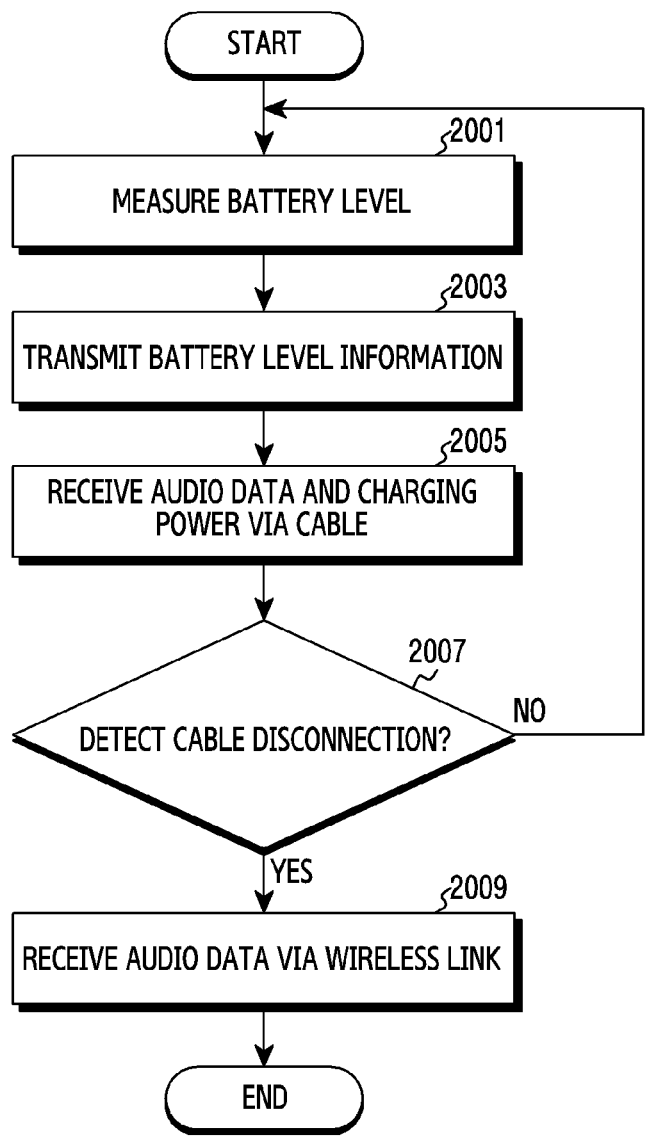
FIG. 20 is a flowchart for illustrating operations of an earpiece according to various embodiments of the present disclosure.

FIG. 20 is a flowchart for illustrating operations of an earpiece according to various embodiments of the present disclosure.

Referring to FIG. 20, in operation 2001, the processor 290 may measure a battery level using the battery level measuring circuit 285.

In operation 2003, the processor 290 may transmit battery level information to the electronic device 101.

Operations 2001 and 2003 of FIG. 20 may be at least in part the same as or similar to operations 1901 and 1903 of FIG. 19, and thus their detailed descriptions shall be omitted here.

In operation 2005, the processor 290 may receive audio data at the first earpiece 203 and the second earpiece 205 via the cable 310 and receive the charging power at the first earpiece 203 and the second earpiece 205 via the cable 310.

In operation 2007, the processor 290 may identify whether the earpiece 200 is disconnected (or detached) from the cable 310. For example, while the connector of the electronic device 101 is connected with the interface 313 of the cable 310, the processor 290 may identify whether the interface 313 of the cable 310 and the interface unit 220 of the earpiece 200 are disconnected.

If the earpiece 200 is not disconnected from the cable 310 (or if the connection is maintained) in operation 2007, the processor 290 may return to operation 2001. In an embodiment, if the earpiece 200 is not disconnected from the cable 310, the processor 290 may return to operation 2003 or 2005.

If the earpiece 200 is disconnected from the cable 310 in operation 2007, the processor 290 may receive audio data via the wireless communication link in operation 2009.

In an embodiment, if the earpiece 200 is disconnected from the cable 310 while the earpiece 200 receives the audio data via the wired communication link (or the cable 310), the processor 290 may receive the audio data at the earpiece 200 via (or by switching from the wired communication link to the wireless communication link) the wireless communication link (e.g., the first wireless communication link 410, the third wireless communication link 511, and the fourth wireless communication link 513).

Figure 21:
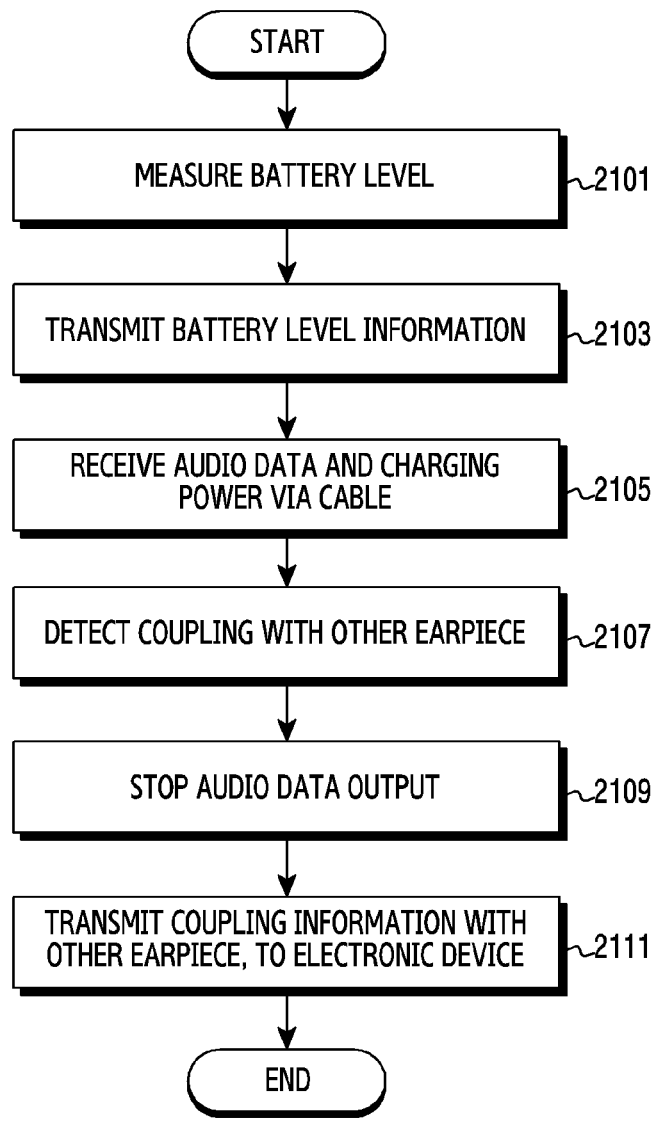
FIG. 21 is a flowchart for illustrating operations of an earpiece according to various embodiments of the present disclosure.

FIG. 21 is a flowchart for illustrating operations of an earpiece according to various embodiments of the present disclosure.

Referring to FIG. 21, in operation 2101, the processor 290 may measure a battery level using the battery level measuring circuit 285.

In operation 2103, the processor 290 may transmit battery level information to the electronic device 101.

In operation 2105, the processor 290 may receive audio data at the first earpiece 203 and the second earpiece 205 via the cable 310 and receive the charging power at the first earpiece 203 and the second earpiece 205 via the cable 310.

Operations 2101 through 2105 of FIG. 21 may be at least in part the same as or similar to operations 2001 through 2005 of FIG. 20, and thus their detailed descriptions shall be omitted here.

In operation 2107, the processor 290 may detect coupling of the earpiece 200 and other earpiece.

In an embodiment, the processor 290 may detect the coupling of the coupling unit 230 (e.g., a magnet) of the earpiece 200 and a coupling unit of the other earpiece through the sensor unit 250 (e.g., a hall sensor). In an embodiment, the processor 290 may detect whether the coupling unit 230 of the earpiece 200 and the coupling unit of the other earpiece keep their proximity, through the sensor unit 250 or the wireless communication unit 210.

In operation 2109, the processor 290 may stop the audio data output received from the electronic device 101. In an embodiment, if detecting the coupling of the earpiece 200 and the other earpiece, the processor 290 may not output the audio data received from the electronic device 101. Operation 2109 may be omitted according to embodiments.

In operation 2111, the processor 290 may transmit information indicating that the earpiece 200 is coupled with the other earpiece, to the electronic device 101.

For example, the processor 290 may transmit the information indicating that the first earpiece 203 and the second earpiece 205 are coupled, via the first wireless communication link 410. For example, the processor 290 may transmit the information indicating that the first earpiece 203 and the second earpiece 205 are coupled, via the third wireless communication link 511 or the fourth wireless communication link 513. For example, if the earpiece 200 is connected to the electronic device 101 via the cable 310, the processor 290 may transmit the information indicating that the first earpiece 203 and the second earpiece 205 are coupled, to the electronic device 101 via the cable 310.

Although not depicted in FIG. 21, in an embodiment, the earpiece 200 may receive from the electronic device 101 control information for stopping the audio data output of the earpiece 200, and stop the audio data output based at least in part on the received control information. In an embodiment, the earpiece 200 may transmit the information indicating that the earpiece 200 is coupled with the other earpiece, to the electronic device 101 and then may not receive the audio data from the electronic device 101.

Although not depicted in FIG. 21, if receiving the coupling information of the first earpiece 203 and the second earpiece 205, the electronic device 101 may output the audio data through the sound output device 155. For example, the processor 290 may output the audio data through the speaker of the electronic device 101.

Figure 22:
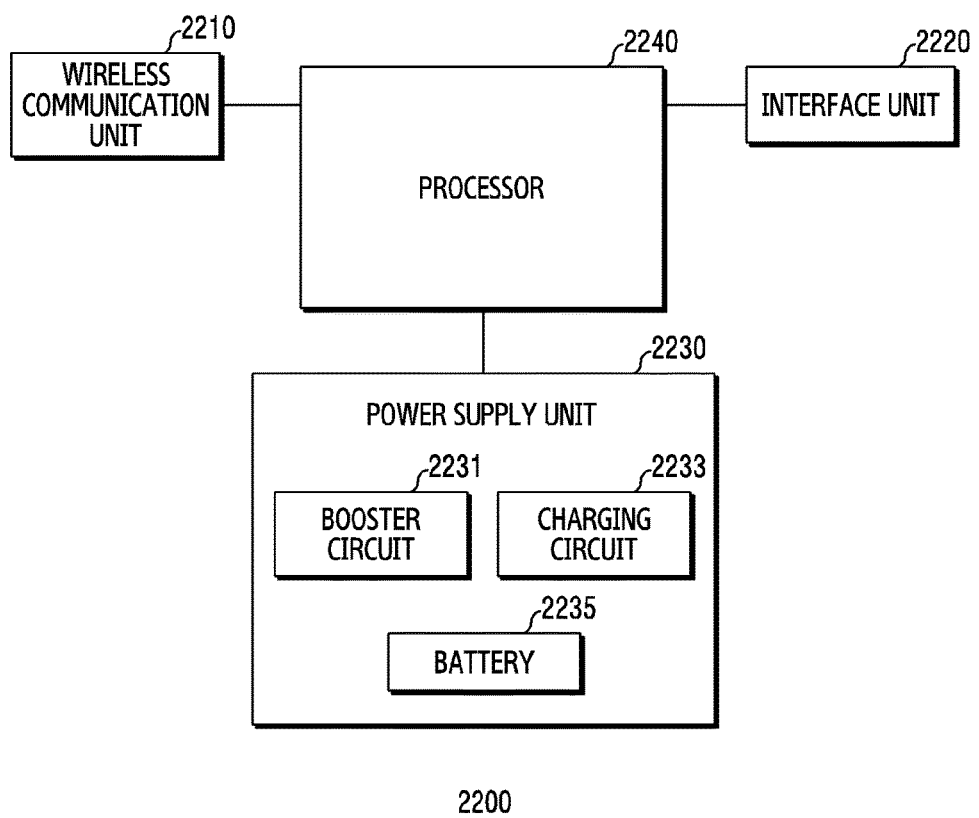
FIG. 22 is a block diagram illustrating a charging device according to various embodiments of the present disclosure.

FIG. 22 is a block diagram illustrating a charging device according to various embodiments of the present disclosure.

Referring to FIG. 22, a charging device 2200 (or a charging case) of FIG. 22 may supply the charging power to the earpiece 200 with the earpiece 200 mounted (or accommodated, or received).

In an embodiment, the charging device 2200 may include a wireless communication unit 2210, an interface unit 2220, a power supply unit 2230, and a processor 2240.

In an embodiment, the wireless communication unit 2210 may include at least one communication module for connecting communication with the electronic device 101 (or an audio source device). In an embodiment, the wireless communication unit 2210 may include a Bluetooth module for conducting Bluetooth communication with the electronic device 101. The module for communicating with the electronic device 101 is not limited to the Bluetooth module, and may include a short-range communication module besides the Bluetooth module.

In an embodiment, the interface unit 2220 may interconnect the charging device 2200 with the earpiece 200 to supply the charging power to the earpiece 200. In an embodiment, the interface unit 2220 may receive the battery level information of the earpiece 200 from the earpiece 200.

In an embodiment, under control of the processor 2240, the power supply unit 2230 may receive the power supply from a battery 2235 or an external device (or a travel adapter) and provide the power supply (or the power) to each component. In an embodiment, the power supply unit 2230 may include a booster circuit 2231, a charging circuit 2233, and the battery 2235.

In an embodiment, the booster circuit 2231 may be connected with the battery 2235, to boost and forward a voltage of the battery 2235 to the charging circuit 2233.

In an embodiment, the charging circuit 2233 may forward the voltage received from the booster circuit 2231 to the earpiece 200. In an embodiment, the charging circuit 2233 may forward a voltage received from the external device to the battery 2235.

Although not depicted in FIG. 22, the charging device 2200 may further include a battery level measuring circuit (e.g., a fuel gauge) and a power management integrated circuit. The battery level measuring circuit may measure information regarding the battery 2235. The power management integrated circuit may manage the power of the charging device 2200.

In an embodiment, the processor 2240 may control the operations of the charging device 2200. In an embodiment, the processor 2240 may have the same or similar configuration to the processor 120 of the electronic device 101 of FIG. 1. The operations of the processor 2240 shall be elucidated in FIG. 23 and FIG. 27.

Although not depicted in FIG. 22, the charging device 2200 may further include a housing which surrounds at least part of the wireless communication unit 2210, the interface unit 2220, the power supply unit 2230, and the processor 2240, and a mounting unit for mounting the earpiece 200.

In various embodiments, the charging device 2200 may be implemented to include more or less configuration than the configuration of FIG. 22.

Figure 23:
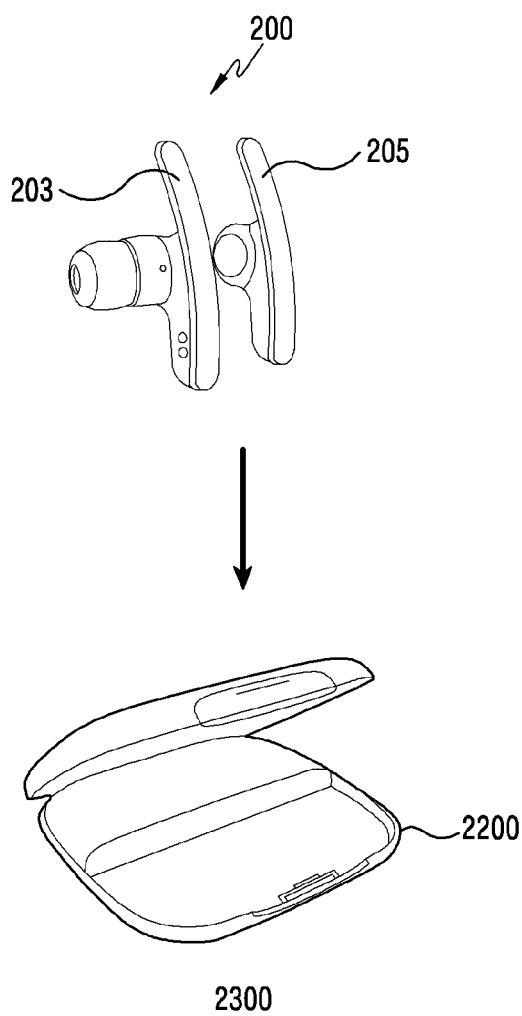
FIG. 23 is a system diagram for illustrating a method for controlling an earpiece according to various embodiments of the present disclosure.

FIG. 23 is a system diagram for illustrating a method for controlling an earpiece according to various embodiments of the present disclosure.

Referring to FIG. 23, a system 2300 may include the charging device 2200 and the earpiece 200.

In an embodiment, the charging device 2200 may supply the charging power to at least one of the first earpiece 203 or the second earpiece 205 via the interface unit 2220, based at least in part on battery level information (or remaining battery amount information) of the first earpiece 203 and battery level information of the second earpiece 205.

In an embodiment, the charging device 2200 may detect that the first earpiece 203 and the second earpiece 205 are mounted. For example, if the first earpiece 203 and the second earpiece 205 are mounted in the charging device 2200, the charging device 2200 may detect that the first earpiece 203 and the second earpiece 205 are mounted, based at least in part on signals received from the first earpiece 203 and the second earpiece 205 via the interface unit 2220.

In an embodiment, the charging device 2200 may receive the battery level information of the first earpiece 203 and the battery level information of the second earpiece 205, from the first earpiece 203 and the second earpiece 205 via the interface unit 2220.

In an embodiment, the charging device 2200 may identify whether a difference between the battery level information of the first earpiece 203 and the battery level information of the second earpiece 205 exceeds a designated threshold.

In an embodiment, if the difference between the battery level information of the first earpiece 203 and the battery level information of the second earpiece 205 exceeds the designated threshold, the electronic device 101 may supply the charging power to, but not limited to, the earpiece of the low battery level (or identified with the low battery level) among the first earpiece 203 or the second earpiece 205. In an embodiment, the charging device 2200 may supply the charging power first to the earpiece of the low battery level via the interface unit 2220 using the quick charging scheme (or the fast charging scheme).

If the difference between the battery level information of the first earpiece 203 and the battery level information of the second earpiece 205 exceeds the designated threshold, the charging device 2200 may supply the charging power to the earpiece of the low battery level (or identified with the low battery level) among the first earpiece 203 or the second earpiece 205 using the quick charging scheme, and supply the charging power to the earpiece of the high battery level using the normal charging scheme.

In an embodiment, if the difference between the battery level information of the first earpiece 203 and the battery level information of the second earpiece 205 falls below the designated threshold, the charging device 2200 may supply the charging power to, but not limited to, the first earpiece 203 and the second earpiece 205 via the interface unit 2220.

In an embodiment, the earpiece 200 may receive the charging power from the charging device 2200. For example, the earpiece 200 may measure the battery level using the battery level measuring circuit 285. The earpiece 200 may transmit the measured battery level information to the charging device 2200. The earpiece 200 may receive the charging power from the charging device 2200.

Figure 24:
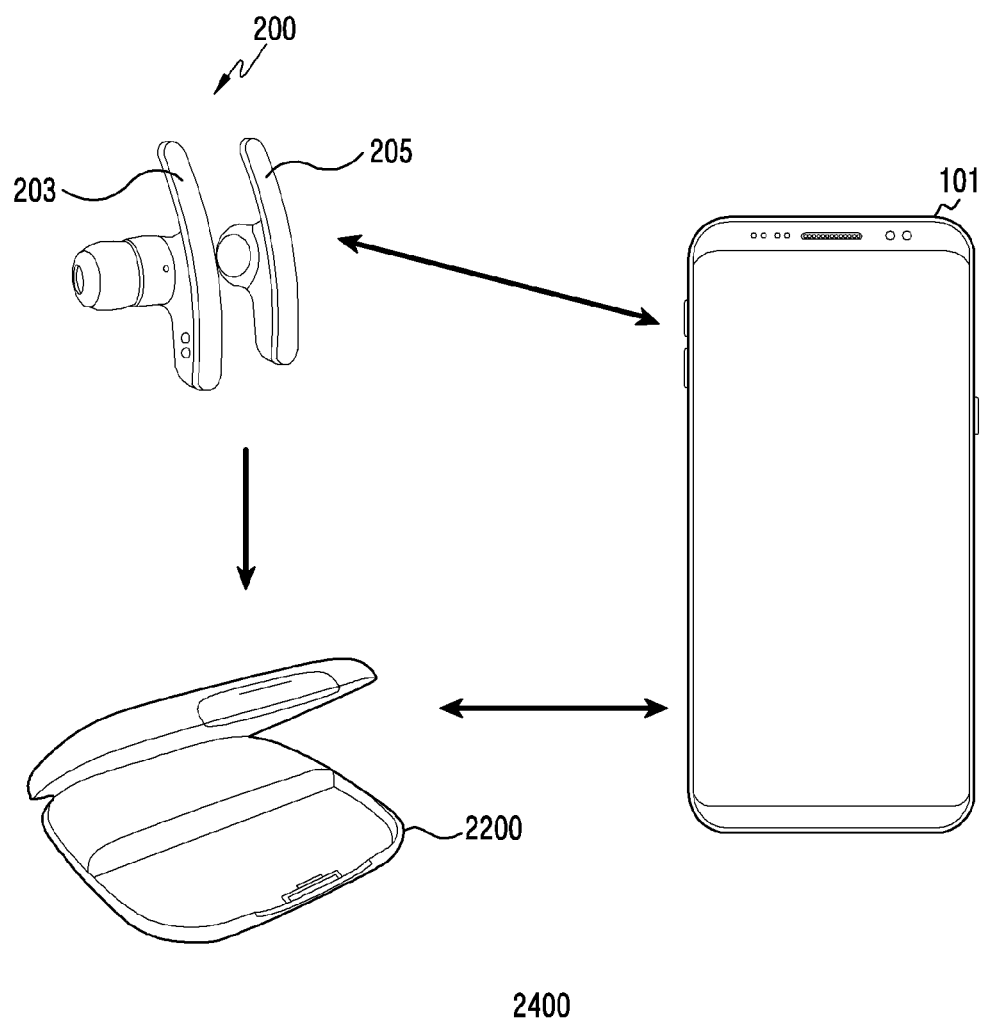
FIG. 24 is a system diagram for illustrating a method for controlling an earpiece according to various embodiments of the present disclosure.

FIG. 24 is a system diagram for illustrating a method for controlling an earpiece according to various embodiments of the present disclosure.

Referring to FIG. 24, a system 2400 may include the charging device 2200, the earpiece 200, and the electronic device 101.

The system 2400 of FIG. 24 is the same or similar to at least part of the system 2300 of FIG. 23, and thus shall be omitted in detailed descriptions.

In an embodiment, the charging device 2200 may receive battery level information of the first earpiece 203 and battery level information of the second earpiece 205 from the electronic device 101 via the wireless communication unit 2210. The electronic device 101 may transmit the battery level information of the first earpiece 203 and the battery level information of the second earpiece 205, which are received from the first earpiece 203 and the second earpiece 205, to the charging device 2200.

In an embodiment, the charging device 2200 may receive user input information for selecting the earpiece to charge, from the electronic device 101 via the wireless communication unit 2210. For example, the electronic device 101 may receive from the user, an input for selecting an intended earpiece to charge among the first earpiece 203 and the second earpiece 205. If the user selects the intended earpiece to charge among the first earpiece 203 and the second earpiece 205, the electronic device 101 may transmit the selected earpiece information to the charging device 2200 via the wireless communication unit 2210.

Figure 25:
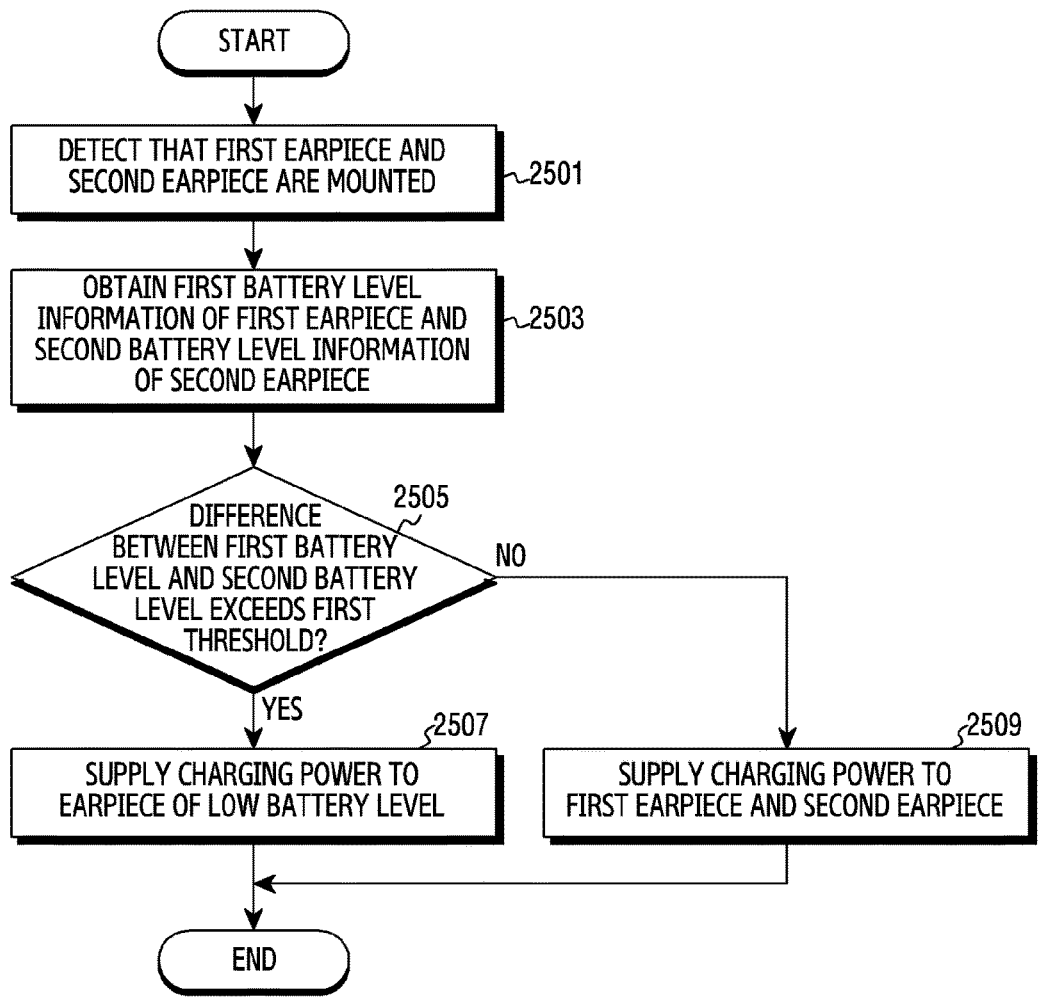
FIG. 25 is a flowchart for illustrating a method of a charging device for transmitting charging power to an earpiece according to various embodiments of the present disclosure.

FIG. 25 is a flowchart for illustrating a method of a charging device for transmitting charging power to an earpiece according to various embodiments of the present disclosure.

Referring to FIG. 25, the processor 2240 may detect that the first earpiece 203 and the second earpiece 205 are mounted in operation 2501.

For example, if the first earpiece 203 and the second earpiece 205 are mounted in the charging device 2200, the charging device 2200 may detect that the first earpiece 203 and the second earpiece 205 are mounted, based at least in part on signals received from the first earpiece 203 and the second earpiece 205 via the interface unit 2220.

In operation 2503, the processor 2240 may obtain first battery level information (or remaining amount information of the battery 2235) of the first earpiece 203 and second battery level information of the second earpiece 205.

In an embodiment, the processor 2240 may obtain the battery level information of the first earpiece 203 and the battery level information of the second earpiece 205, from the first earpiece 203 and the second earpiece 205 via the interface unit 2220.

In an embodiment, the processor 2240 may obtain the battery level information of the first earpiece 203 and the battery level information of the second earpiece 205, from the electronic device 101 through the wireless communication unit 2210.

In operation 2505, the processor 2240 may identify whether a difference between the first battery level and the second battery level exceeds a first threshold.

In an embodiment, the processor 2240 may vary (or adjust) the first threshold, according to whether the first battery level of the first earpiece 203 which serves as the master is greater than the second battery level of the second earpiece 205 which serves as the slave.

In an embodiment, the processor 2240 may set (or change) the first threshold according to a user input. For example, the processor 2240 may receive a user input for setting the first threshold. The processor 2240 may set the first threshold based at least in part on the user input.

If the difference between the first battery level and the second battery level exceeds the first threshold in operation 2505, the processor 2240 may supply the charging power to the earpiece of the low battery level among the first earpiece 203 and the second earpiece 205 via the interface unit 2220 in operation 2507.

In an embodiment, the processor 2240 may supply the charging power first to the earpiece of the low battery level using the quick charging scheme.

In an embodiment, the processor 2240 may output a notification regarding the earpiece of the low battery level among the first earpiece 203 and the second earpiece 205. For example, if the first earpiece 203 has the lower battery level than the second earpiece 205, the processor 2240 may output indication, vibration, light, or sound indicative of the low battery level of the first earpiece 203.

In an embodiment, if the charging power is supplied first to the earpiece of the low battery level and then the earpiece of the low battery level reaches a designated battery level (or the earpieces reach the same battery level), the processor 2240 may supply the charging power to the first earpiece 203 and the second earpiece 205 in order to charge the earpiece of the low battery level (e.g., the first earpiece 203) and the earpiece of the high battery level (e.g., the second earpiece 205) at the same time.

If the difference between the first battery level and the second battery level falls below the first threshold in operation 2505, the processor 2240 may supply the charging power to the first earpiece 203 and the second earpiece 205 via the interface unit 2220 in operation 2509.

Figure 26:
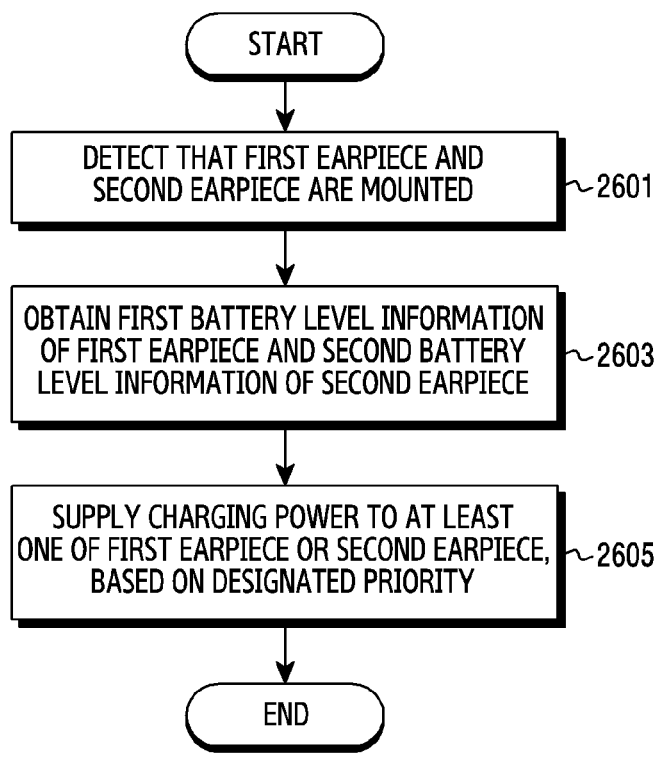
FIG. 26 is a flowchart for illustrating a method of a charging device for transmitting charging power to an earpiece according to various embodiments of the present disclosure.

FIG. 26 is a flowchart for illustrating a method of a charging device for transmitting charging power to an earpiece according to various embodiments of the present disclosure.

Referring to FIG. 26, the processor 2240 may detect that the first earpiece 203 and the second earpiece 205 are mounted in operation 2601.

In operation 2603, the processor 2240 may obtain first battery level information (or remaining amount information of the battery 2235) of the first earpiece 203 and second battery level information of the second earpiece 205.

Operations 2601 and 2603 of FIG. 26 may be at least in part the same as or similar to operations 2501 and 2503 of FIG. 25, and thus their detailed descriptions shall be omitted here.

In operation 2605, the processor 2240 may supply the charging power to at least one of the first earpiece 203 or the second earpiece 205, based on a designated priority.

In an embodiment, the processor 2240 may control to charge a master earpiece (or the earpiece serving as the master) among the first earpiece 203 and the second earpiece 205. In an embodiment, the processor 2240 may first charge the earpiece of the low battery level among the first earpiece 203 and the second earpiece 205. In an embodiment, based at least in part on a power consumption condition (or status) (or function execution) of at least one of the first earpiece 203 or the second earpiece 205, the processor 2240 may charge at least one of the first earpiece 203 or the second earpiece 205. In an embodiment, the processor 2240 may control to supply the charging power first to an earpiece of a high priority via the cable 310, based on the designated priority, using the quick charging scheme (or the normal charging scheme).

In an embodiment, the processor 2240 may control to fully charge the earpiece of the high priority by supplying the charging power first to the earpiece of the high priority, and then to supply the charging power to the earpiece of the battery level of the low priority.

In an embodiment, the processor 2240 may control to fully charge the earpiece of the low battery level by supplying the charging power first to the earpiece of the low battery level, and then to supply the charging power to the earpiece of the high battery level.

In an embodiment, the processor 2240 may control to supply the charging power first to the earpiece of the high priority and then, if the earpiece of the high priority reaches a designated battery level, to charge the earpiece of the low priority.

In an embodiment, if the charging power is supplied first to the earpiece of the high battery level and then the earpiece of the high battery level reaches the battery level of the earpiece of the low priority (or reaches the same battery level of the earpiece of the low priority), the processor 2240 may supply the charging power to the earpiece of the low battery level and the earpiece of the high battery level in order to charge the earpiece of the low battery level and the earpiece of the high battery level at the same time.

In an embodiment, if the same priority (e.g., the first earpiece 203 and the second earpiece 205 do not execute functions) or no priority is assigned to the first earpiece 203 and the second earpiece 205, the processor 2240 may control to supply the charging power to the first earpiece 203 and the second earpiece 205 via the cable 310 at the same time.

In an embodiment, if supplying the charging power to both of the first earpiece 203 and the second earpiece 205 through the cable 310, the processor 2240 may control to supply the charging power to the first earpiece 203 and the second earpiece 205 through the cable 310 using the normal charging scheme.

In an embodiment, if supplying the charging power to both of the first earpiece 203 and the second earpiece 205 through the cable 310, the processor 2240 may control to supply the charging power to the first earpiece 203 and the second earpiece 205 through the cable 310 using the quick charging scheme.

In an embodiment, if supplying the charging power to both of the first earpiece 203 and the second earpiece 205 through the cable 310, the processor 2240 may control to supply the charging power to the first earpiece 203 and the second earpiece 205 through the cable 310 using the quick charging scheme until at least one of the first earpiece 203 or the second earpiece 205 reaches the designated battery level, and to supply the charging power using the normal charging scheme if the battery level reaches the designated battery level.

Figure 27:
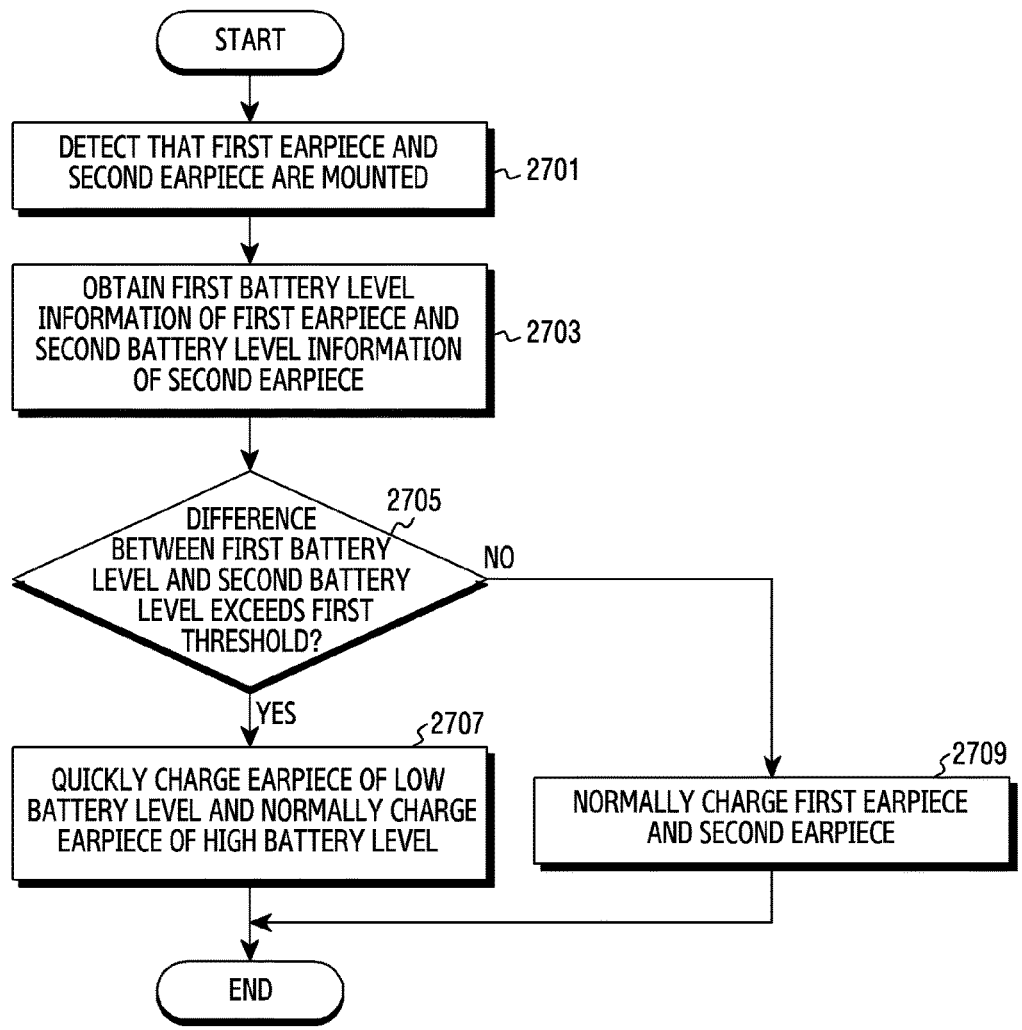
FIG. 27 is a flowchart for illustrating a method of a charging device for transmitting charging power to an earpiece according to various embodiments of the present disclosure.

FIG. 27 is a flowchart for illustrating a method of a charging device for transmitting charging power to an earpiece according to various embodiments of the present disclosure.

Referring to FIG. 27, the processor 2240 may detect that the first earpiece 203 and the second earpiece 205 are mounted in operation 2701.

In operation 2703, the processor 2240 may obtain first battery level information (or remaining amount information of the battery 2235) of the first earpiece 203 and second battery level information of the second earpiece 205.

In operation 2705, the processor 2240 may identify whether a difference between the first battery level and the second battery level exceeds a first threshold.

Operations 2701 through 2705 of FIG. 27 may be at least in part the same as or similar to operations 2501 through 2505 of FIG. 25, and thus their detailed descriptions shall be omitted here.

If the difference between the first battery level and the second battery level exceeds the first threshold in operation 2705, the processor 2240 may quickly charge the earpiece of the low battery level and normally charge the earpiece of the high battery level in operation 2707.

For example, the processor 2240 may supply the charging power to the earpiece of the low battery level using the quick charging scheme, and supply the charging power to the earpiece of the high battery level using the normal charging scheme, among the first earpiece 203 or the second earpiece 205.

In an embodiment, the processor 2240 may supply the charging power to the earpiece of the low battery level using the quick charging scheme, and supply the charging power to the earpiece of the high battery level using the normal charging scheme, among the first earpiece 203 or the second earpiece 205, and then if the first earpiece 203 and the second earpiece 205 reach the same battery level, charge the first earpiece 203 and the second earpiece 205 using the normal charging scheme.

If the difference between the first battery level and the second battery level falls below the first threshold in operation 2705, the processor 2240 may supply the charging power to the first earpiece 203 and the second earpiece 205 using the normal charging scheme in operation 2709.

A method for controlling an earpiece in an electronic device according to various embodiments of the present disclosure may include receiving first battery level information of a first earpiece and second battery level information of a second earpiece, via a communication interface, identifying a charging method corresponding to the first battery level and the second battery level, among a plurality of charging methods for charging at least one of the first earpiece or the second earpiece, and controlling to supply charging power to at least one of the first earpiece or the second earpiece, via a cable which connects the electronic device with at least one of the first earpiece or the second earpiece, using the charging method.

In various embodiments, identifying the charging method corresponding to the first battery level and the second battery level may include identifying whether a difference between the first battery level and the second battery level exceeds a first threshold, and if the difference between the first battery level and the second battery level exceeds the first threshold, supplying the charging power to an earpiece of a low battery level among the first earpiece or the second earpiece.

In various embodiments, identifying the charging method corresponding to the first battery level and the second battery level may include, if the difference between the first battery level and the second battery level falls below the first threshold, supplying the charging power to the first earpiece and the second earpiece.

In various embodiments, the method may further include identifying a battery level of the electronic device, if the battery level of the electronic device exceeds a second threshold, supplying the charging power to the first earpiece and the second earpiece via the cable, and if the battery level of the electronic device falls below the second threshold, stopping the charging power supply to the first earpiece and the second earpiece via the cable.

In various embodiments, the method may further include identifying a battery level of the electronic device, if the battery level of the electronic device exceeds a third threshold, supplying the charging power to the first earpiece and the second earpiece via the cable, if the battery level of the electronic device falls below the third threshold and exceeds a fourth threshold, supplying the charging power to an earpiece of a low battery level among the first earpiece and the second earpiece via the cable, based on whether the difference between the first battery level and the second battery level exceeds the first threshold, and if the battery level of the electronic device falls below the fourth threshold, stopping the charging power supply to the first earpiece and the second earpiece via the cable.

In various embodiments, the method may further include identifying a battery level of the electronic device, if the battery level of the electronic device exceeds a third threshold, supplying the charging power to the first earpiece and the second earpiece via the cable, if the battery level of the electronic device falls below the third threshold and exceeds a fourth threshold, supplying the charging power to an earpiece which operates as a master among the first earpiece and the second earpiece via the cable, and if the battery level of the electronic device falls below the fourth threshold, stopping the charging power supply to the first earpiece and the second earpiece via the cable.

In various embodiments, the method may further include identifying an earpiece which operates as a master among the first earpiece and the second earpiece, and supplying the charging power first to the master earpiece over an earpiece which operates as a slave, via the cable.

In various embodiments, the method may further include receiving a user input which selects the first earpiece or the second earpiece, and supplying the charging power to the selected earpiece.

In various embodiments, the method may further include, in response to receiving coupling information of the first earpiece and the second earpiece while transmitting audio data and supplying the charging power to the first earpiece and the second earpiece, stopping audio data output of the first earpiece and the second earpiece and outputting the audio data at the electronic device.

In various embodiments, the method may further include identifying that the first earpiece or the second earpiece is disconnected from the cable, and supplying the charging power to an earpiece which is still connected to the electronic device among the first earpiece and the second earpiece, via the cable.

A data structure used in the above-stated embodiments of the present disclosure may be recorded on a computer-readable recording medium through various means. The computer-readable recording medium may include storage media such as magnetic storage media (e.g., a ROM, a floppy disk, a hard disc, etc.) and optical storage media (e.g., a compact disk (CD)-ROM, a digital versatile disk (DVD), etc.).

In an embodiment, a computer-readable recording medium may record a program in an electronic device, for receiving first battery level information of a first earpiece and second battery level information of a second earpiece, via a communication interface, identifying a charging method corresponding to the first battery level and the second battery level, among a plurality of charging methods for charging at least one of the first earpiece or the second earpiece, and controlling to supply charging power to at least one of the first earpiece or the second earpiece, via a cable which connects the electronic device with at least one of the first earpiece or the second earpiece, using the charging method.

A method and an electronic device for controlling an earpiece according to various embodiments of the present disclosure may provide the charging power and the audio data to audible devices based on the remaining battery amount of the audible devices which operate in pair, and thus control to maintain the same or similar battery levels of the audible devices.

As the same or similar battery levels of the audible devices are maintained, the user who is wearing the audible devices may extend time for listening to music using the audible devices.

Various embodiments of the present disclosure have been shown and described. It would be appreciated by those skilled in the art that changes may be made in these example embodiments without departing from the principles and spirit of the disclosure, the scope of which is defined by the claims and their equivalents. It should be understood that the example embodiments described herein should be considered in a descriptive sense only and not for purposes of limitation. Descriptions of features or aspects within each embodiment should typically be considered as available for other similar features or aspects in other embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a communication interface; and
a processor configured to:
control the communication interface to receive first battery level information of a first earpiece and second battery level information of a second earpiece,
identify a charging method, corresponding to the first battery level and the second battery level, among a plurality of charging methods for charging at least one of the first earpiece or the second earpiece, and
control to supply charging power to at least one of the first earpiece or the second earpiece, via a cable connecting the electronic device with at least one of the first earpiece or the second earpiece, using the charging method.

2. The electronic device of claim 1, wherein the processor is configured to:
identify whether a difference between the first battery level and the second battery level exceeds a first threshold, and
if the difference between the first battery level and the second battery level exceeds the first threshold, supply the charging power to an earpiece of a low battery level among the first earpiece or the second earpiece.

3. The electronic device of claim 2, wherein the processor is configured to supply the charging power to the first earpiece and the second earpiece if the difference between the first battery level and the second battery level falls below the first threshold.

4. The electronic device of claim 1, wherein the processor is configured to:
identify a battery level of the electronic device,
if the battery level of the electronic device exceeds a second threshold, control to supply the charging power to the first earpiece and the second earpiece via the cable, and
if the battery level of the electronic device falls below second threshold, control to stop the charging power supply to the first earpiece and the second earpiece via the cable.

5. The electronic device of claim 1, wherein the processor is configured to:
identify a battery level of the electronic device,
if the battery level of the electronic device exceeds a third threshold, control to supply the charging power to the first earpiece and the second earpiece via the cable,
if the battery level of the electronic device falls below the third threshold and exceeds a fourth threshold, control to supply the charging power to an earpiece of a low battery level among the first earpiece and the second earpiece via the cable based on whether a difference between the first battery level and the second battery level exceeds a first threshold, and
if the battery level of the electronic device falls below the fourth threshold, control to stop the charging power supply to the first earpiece and the second earpiece via the cable.

6. The electronic device of claim 1, wherein the processor is configured to:
identify a battery level of the electronic device,
if the battery level of the electronic device exceeds a third threshold, control to supply the charging power to the first earpiece and the second earpiece via the cable,
if the battery level of the electronic device falls below the third threshold and exceeds a fourth threshold, control to supply the charging power to an earpiece configured to operate as a master among the first earpiece and the second earpiece via the cable, and
if the battery level of the electronic device falls below the fourth threshold, control to stop the charging power supply to the first earpiece and the second earpiece via the cable.

7. The electronic device of claim 1, wherein the processor is configured to:
identify an earpiece configured to operate as a master among the first earpiece and the second earpiece, and
control to supply the charging power first to the master earpiece, over an earpiece configured to operate as a slave, via the cable.

8. The electronic device of claim 1, wherein the processor is configured to:
control the communication interface to receive a user input selecting the first earpiece or the second earpiece, and
control to supply the charging power to the selected earpiece.

9. The electronic device of claim 1, wherein the processor is configured to, in response to receiving coupling information of the first earpiece and the second earpiece while transmitting audio data and supplying the charging power to the first earpiece and the second earpiece, stop audio data output of the first earpiece and the second earpiece and control the electronic device to output the audio data.

10. The electronic device of claim 1, wherein the processor is configured to:
identify that the first earpiece or the second earpiece is disconnected from the cable, and
control to supply the charging power to an earpiece, among the first earpiece and the second earpiece which is still connected to the electronic device, via the cable.

11. A method for controlling an earpiece in an electronic device, comprising:
receiving first battery level information of a first earpiece and second battery level information of a second earpiece via a communication interface;
identifying a charging method, corresponding to the first battery level and the second battery level, among a plurality of charging methods for charging at least one of the first earpiece or the second earpiece; and
supplying charging power to at least one of the first earpiece or the second earpiece, via a cable connecting the electronic device with at least one of the first earpiece or the second earpiece, using the charging method.

12. The method of claim 11, wherein identifying the charging method corresponding to the first battery level and the second battery level comprises:
identifying whether a difference between the first battery level and the second battery level exceeds a first threshold; and
supplying the charging power to an earpiece of a low battery level among the first earpiece or the second earpiece based on the difference between the first battery level and the second battery level exceeding the first threshold.

13. The method of claim 12, wherein identifying the charging method corresponding to the first battery level and the second battery level comprises supplying the charging power to the first earpiece and the second earpiece based on a difference between the first battery level and the second battery level falling below the first threshold.

14. The method of claim 11, further comprising:
identifying a battery level of the electronic device;
supplying the charging power to the first earpiece and the second earpiece via the cable based on the battery level of the electronic device exceeding a second threshold; and
stopping the charging power supply to the first earpiece and the second earpiece via the cable based on the battery level of the electronic device falling below a second threshold.

15. The method of claim 11, further comprising:
identifying a battery level of the electronic device;
supplying the charging power to the first earpiece and the second earpiece via the cable based on the battery level of the electronic device exceeding a third threshold;
supplying the charging power to an earpiece of a low battery level among the first earpiece and the second earpiece via the cable based on (i) the battery level of the electronic device falling below the third threshold and exceeding a fourth threshold and (ii) whether a difference between the first battery level and the second battery level exceeds a first threshold; and
stopping the charging power supply to the first earpiece and the second earpiece via the cable based on the battery level of the electronic device falling below the fourth threshold.

16. The method of claim 11, further comprising:
identifying a battery level of the electronic device;
supplying the charging power to the first earpiece and the second earpiece via the cable based on the battery level of the electronic device exceeding a third threshold;
if the battery level of the electronic device falls below the third threshold and exceeds a fourth threshold, supplying the charging power to an earpiece configured to operate as a master among the first earpiece and the second earpiece via the cable based on the battery level of the electronic device falling below the third threshold and exceeding a fourth threshold; and
stopping the charging power supply to the first earpiece and the second earpiece via the cable based on the battery level of the electronic device falling below the fourth threshold.

17. The method of claim 11, further comprising:
identifying an earpiece configured to operate as a master among the first earpiece and the second earpiece; and
supplying the charging power first to the master earpiece over an earpiece configured to operate as a slave via the cable.

18. The method of claim 11, further comprising:
receiving a user input selecting the first earpiece or the second earpiece; and
supplying the charging power to the selected earpiece.

19. The method of claim 11, further comprising:
in response to receiving coupling information of the first earpiece and the second earpiece while transmitting audio data and supplying the charging power to the first earpiece and the second earpiece, stopping audio data output of the first earpiece and the second earpiece and outputting the audio data at the electronic device.

20. The method of claim 11, further comprising:
identifying that the first earpiece or the second earpiece is disconnected from the cable; and
supplying the charging power to an earpiece, among the first earpiece and the second earpiece which is still connected to the electronic device, via the cable.

* * * * *